(12) United States Patent
Shafin et al.

(10) Patent No.: US 12,483,980 B2
(45) Date of Patent: Nov. 25, 2025

(54) METHOD AND APPARATUS FOR ENABLING EMLSR OPERATION WITH TWT OVER MULTIPLE LINKS

(71) Applicant: Samsung Electronics Co., Ltd., Suwon-si (KR)

(72) Inventors: Rubayet Shafin, Allen, TX (US); Boon Loong Ng, Plano, TX (US); Vishnu Vardhan Ratnam, Plano, TX (US); Ahmed Atef Ibrahim Ibrahim, Plano, TX (US); Peshal Nayak, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 437 days.

(21) Appl. No.: 18/054,526

(22) Filed: Nov. 10, 2022

(65) Prior Publication Data

US 2023/0180124 A1 Jun. 8, 2023

Related U.S. Application Data

(60) Provisional application No. 63/398,475, filed on Aug. 16, 2022, provisional application No. 63/337,898, (Continued)

(51) Int. Cl.
*H04W 52/02* (2009.01)
*H04W 76/15* (2018.01)
*H04W 84/12* (2009.01)

(52) U.S. Cl.
CPC ....... *H04W 52/0206* (2013.01); *H04W 76/15* (2018.02); *H04W 84/12* (2013.01)

(58) Field of Classification Search
CPC ......... H04W 52/0216; H04W 52/0206; H04W 52/0229; H04W 76/15; H04W 84/12
See application file for complete search history.

(56) References Cited

U.S. PATENT DOCUMENTS

2021/0007168 A1 1/2021 Asterjadhi et al.
2021/0058868 A1* 2/2021 Cariou .............. H04W 52/0206
(Continued)

OTHER PUBLICATIONS

IEEE P802.11be-D2.1 "Part 11: Wireless LAN Medium Access Control (MAC) and Physical Layer (PHY) Specifications, Amendment 8: Enhancements for extremely high throughput (EHT)" Jul. 2022, 885 pages.
(Continued)

*Primary Examiner* — Peter Chen

(57) ABSTRACT

Methods and apparatuses for facilitating the coexistence of target wake time (TWT) and enhanced multi-link single radio EMLSR operations for multi-link devices (MLDs). A non-access point (AP) MLD comprises STAs, each comprising a transceiver configured to form a link with a corresponding AP of an AP MLD, and a processor. At least a subset of the links are EMLSR links. TWT schedules are established for communications on at least two of the EMLSR links, each having a TWT service period (SP). The processor is configured to determine whether there is an overlap between a first of the TWT SPs that corresponds to a first of the EMLSR links and other TWT SPs that correspond to other EMLSR links, based on the overlap existing, prioritize the first EMLSR link based on criteria related to each of the TWT schedules, and initiate a frame exchange on the prioritized EMLSR link.

20 Claims, 14 Drawing Sheets

Related U.S. Application Data filed on May 3, 2022, provisional application No. 63/285,773, filed on Dec. 3, 2021.

(56) References Cited

U.S. PATENT DOCUMENTS

2022/0078844 A1* 3/2022 Cherian ............... H04W 74/08
2023/0144291 A1* 5/2023 Naik ................ H04W 74/0816
370/329

OTHER PUBLICATIONS

Extended European Search Report issued Sep. 25, 2024 regarding Application No. 22901643.1, 9 pages.
Chu et al., "Low Latency Support", doc .: IEEE 802.11-20/1058r0, Sep. 2020, 10 pages.
Asterjadhi, "Proposed Draft Specification for leftover TBDs", doc.: IEEE 802.11-21/0572r0, Apr. 2021, 19 pages.
IEEE P802.11be-D0.4 "Part 11: Wireless LAN Medium Access Control (MAC) and Physical Layer (PHY) Specifications—Amendment 8: Enhancements for extremely high throughput (EHT)" Mar. 2021, 511 pgs.
International Search Report and Written Opinion issued Feb. 23, 2023 regarding International Application No. PCT/KR2022/018375, 8 pages.
Chu et al., "Low Latency Support", IEEE 802.11-20/1058r1, Oct. 2020, 10 pages.
Xin et al., "Channel Access for Latency Sensitive Traffic", IEEE 802.11-21/0894r0, Sep. 2021, 9 pages.
Kang et al., "TID-to-Link mapping in eMLSR", IEEE 802.11-21/1747r1, Nov. 2021, 9 pages.
Hu et al., "Traffic Prioritization During the Restricted TWT SPs", IEEE 802.11-21/1115r0, Jul. 2021, 14 pages.

* cited by examiner

METHOD AND APPARATUS FOR ENABLING EMLSR OPERATION WITH TWT OVER MULTIPLE LINKS

CROSS-REFERENCE TO RELATED APPLICATION AND CLAIM OF PRIORITY

This application claims priority under 35 U.S.C. § 119(e) to U.S. Provisional Patent Application No. 63/285,773 filed on Dec. 3, 2021, U.S. Provisional Patent Application No. 63/337,898 filed on May 3, 2022, and U.S. Provisional Patent Application No. 63/398,475 filed on Aug. 16, 2022, which are hereby incorporated by reference in their entirety.

TECHNICAL FIELD

This disclosure relates generally to transmission efficiency in wireless communications systems that include multi-link devices. Embodiments of this disclosure relate to methods and apparatuses for enabling the coexistence of target wake time operation and enhanced multi-link single radio operation in a multi-link device in a wireless local area network communications system.

BACKGROUND

Wireless local area network (WLAN) technology allows devices to access the internet in the 2.4 GHz, 5 GHz, 6 GHz, or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Next generation extremely high throughput (EHT) WI-FI systems, e.g., IEEE 802.11be, support multiple bands of operation, called links, over which an access point (AP) and a non-AP device can communicate with each other. Thus, both the AP and non-AP device may be capable of communicating on different bands/links, which is referred to as multi-link operation (MLO). The WI-FI devices that support MLO are referred to as multi-link devices (MLDs). With MLO, it is possible for a non-access point (non-AP) MLD to discover, authenticate, associate, and set up multiple links with an AP MLD. Channel access and frame exchange is possible on each link that is set up between the AP MLD and non-AP MLD.

The non-AP MLDs in 802.11be can have different capabilities in terms of multi-link operation. Many 802.11be non-AP MLDs may only have a single radio. Enhanced Multi-Link Single Radio (EMLSR) enables a multi-link operation with a single radio. With EMLSR operation, such a non-AP MLD can achieve throughput enhancement with reduced latency—a performance close to concurrent dual radio non-AP MLDs.

EMLSR mode may also be implemented on multi-radio MLDs to improve channel access capability with limited hardware cost and power consumption or to improve spectral efficiency. In EMLSR mode, a multi-radio non-AP device behaves like a single radio device that can perform channel sensing and reception of elementary packets on multiple bands/links simultaneously but can perform reliable data communication on only one link at a time. Thus, by opportunistically selecting a link for data communication where it wins the channel contention, EMLSR can improve system spectral efficiency.

Target Wake Time (TWT) is one of the important features of the IEEE 802.11ax amendment. TWT enables wake time negotiation between an access point (AP) and an associated station (STA) for improving power efficiency. With TWT operation, it suffices for a STA to only wake up at pre-scheduled time negotiated with another STA or AP in the network. In IEEE 802.11ax standards, two types of TWT operation are possible—individual TWT operation and broadcast TWT operation. Individual TWT agreements can be established between two STAs or between a STA and an AP. On the other hand, with broadcast TWT (bTWT) operation, an AP can set up a shared TWT session for a group of STAs.

Restricted TWT (rTWT or R-TWT) operation, which is based on broadcast TWT operation, is a feature introduced with a view to providing better support for latency sensitive applications. Restricted TWT offers a protected service period for its member STAs by sending Quiet elements to other STAs in the basic service set (BSS) which are not members of the restricted TWT schedule, where the Quiet interval corresponding to the Quiet element overlaps with the initial portion of the restricted TWT SP. Hence, it gives more channel access opportunity for the restricted TWT member scheduled STAs, which helps latency-sensitive traffic flow.

TWT operation would be essential for efficient power management for MLDs. Broadcast TWT is a special kind of TWT operation where multiple STA can obtain membership of the same TWT schedule. Restricted TWT schedule, a variant of broadcast TWT schedule, can be set for multi-link devices for efficient power management.

SUMMARY

Embodiments of the present disclosure provide methods and apparatuses for facilitating the coexistence of TWT operation and EMLSR operation for MLDs in a WLAN when multiple TWT schedules are established on multiple links between an AP MLD and a non-AP MLD.

In one embodiment, a non-AP MLD is provided, comprising STAs and a processor operably coupled to the STAs. The STAs each comprise a transceiver configured to form a link with a corresponding AP of an AP MLD. At least a subset of the links are EMLSR links that are configured to operate in an EMLSR mode of operation. TWT schedules are established for communications on at least two of the EMLSR links, each of the TWT schedules having a TWT SP. The processor is configured to determine whether there is an overlap between a first of the TWT SPs that corresponds to a first of the at least two EMLSR links and other TWT SPs that correspond to others of the at least two EMLSR links, based on a determination that the overlap exists, prioritize the first EMLSR link based on at least one criterion related to each of the TWT schedules, and initiate a frame exchange on the prioritized EMLSR link.

In another embodiment, an AP MLD is provided, comprising APs and a processor operably coupled to the APs. The APs each comprise a transceiver configured to form a link with a corresponding STA of a non-AP MLD. At least a subset of the links are EMLSR links that are configured to operate in an EMLSR mode of operation. TWT schedules are established for communications on at least two of the EMLSR links, each of the TWT schedules having a TWT SP. The processor is configured to determine whether there is an overlap between a first of the TWT SPs that corresponds to a first of the at least two EMLSR links and other TWT SPs that correspond to others of the at least two EMLSR links, based on a determination that the overlap exists, prioritize the first EMLSR link based on at least one criterion related to each of the TWT schedules, and initiate a frame exchange on the prioritized EMLSR link.

In another embodiment, a method of wireless communication is provided, performed by a non-AP MLD that comprises STAs that each comprise a transceiver configured to form a link with a corresponding AP of an AP MLD, at least a subset of the links being EMLSR links that are configured to operate in an EMLSR mode of operation, and TWT schedules being established for communications on at least two of the EMLSR links, each of the TWT schedules having a TWT SP. The method includes the steps of determining whether there is an overlap between a first of the TWT SPs that corresponds to a first of the at least two EMLSR links and other TWT SPs that correspond to others of the at least two EMLSR links, based on a determination that the overlap exists, prioritizing the first EMLSR link based on at least one criterion related to each of the TWT schedules, and initiating a frame exchange on the prioritized EMLSR link.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

A non-AP STA affiliated with a non-AP MLD may establish one or more restricted TWT schedules (or agreements) over multiple links between the AP MLD and the non-AP MLD. Embodiments of the present disclosure recognize that if those links are also included in the EMLSR links (meaning that a frame exchange may only be performed on one of the links at a given time), and if the TWT service periods (SPs) on those links are overlapping in time or nearly overlapping in time, such that a complete frame exchange cannot be completed in one TWT SP on one of the links without overlapping another TWT SP on another of the links (where a complete frame exchange may include a guard time to provide enough time for, e.g., an EMLSR Transition Delay before switching links—that is, one TWT SP that overlaps with a guard time before or after another TWT SP is considered to overlap with that other TWT SP), then when the non-AP MLD transitions into the EMLSR mode of operation it is unclear which link, out of the links on which the TWT schedules or agreements are set up, can be selected by the AP or non-AP MLD for sending the EMLSR initial control frame (MU-RTS, BSRP, etc.).

Accordingly, embodiments of the present disclosure provide methods and apparatuses to enable EMLSR operation for links between an AP MLD and a non-AP MLD on which multiple TWT schedules are established. These include methods and apparatuses for selecting one link, from among the links on which TWT SPs overlap or nearly overlap, for sending the EMLSR initial control frame.

Figure 1:
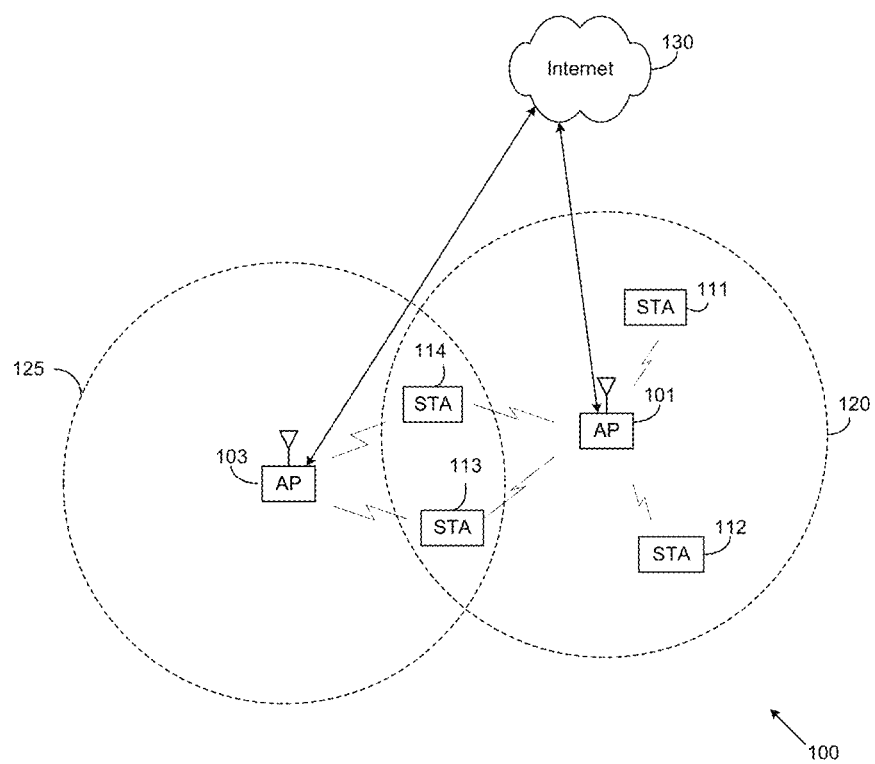
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating the coexistence of TWT operation and EMLSR operation for MLDs in a WLAN when multiple TWT schedules are established on multiple links between an AP MLD and a non-AP MLD. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
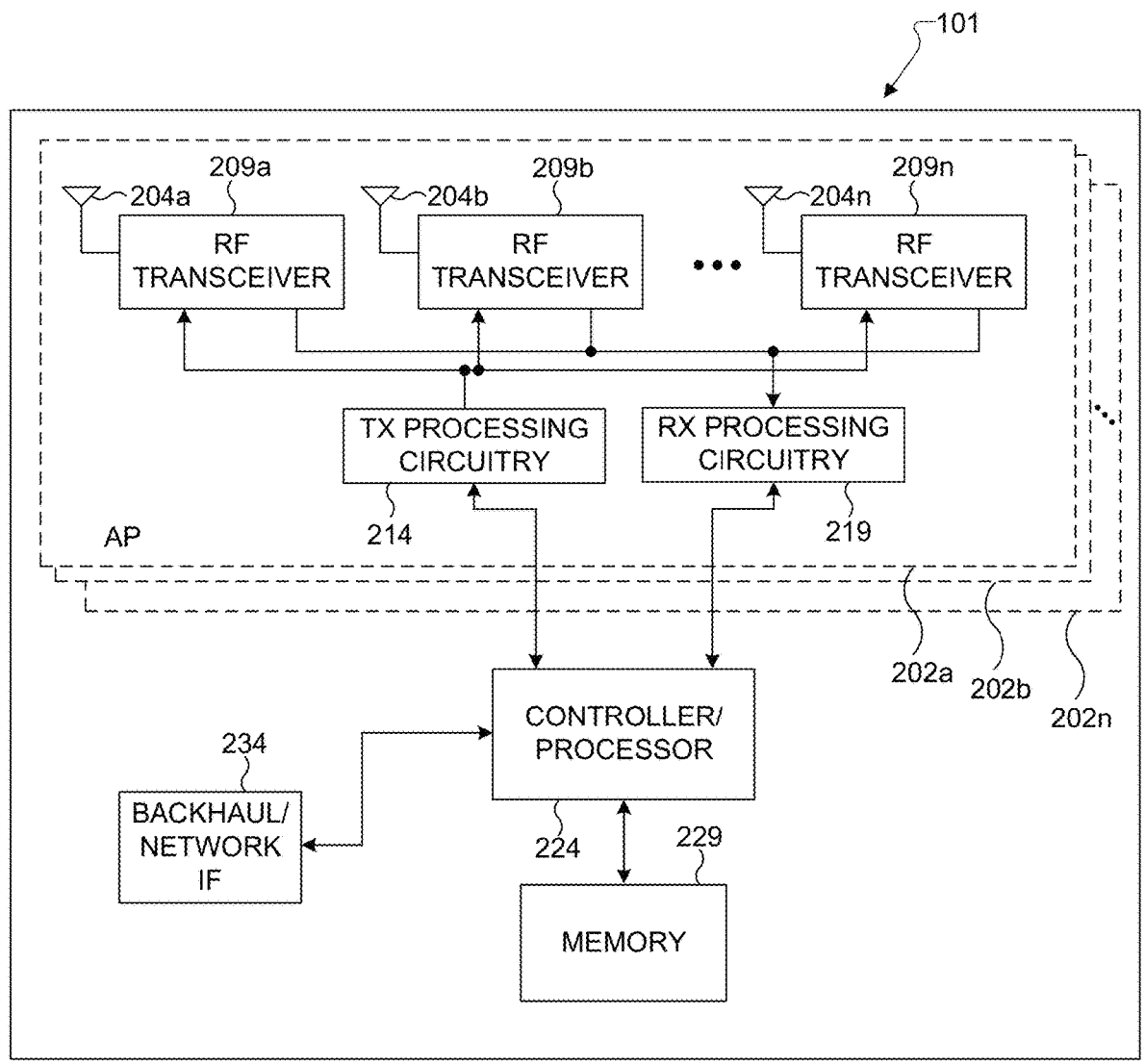
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202a-202n (which may be referred to, for example, as AP1-APn). Each of the affiliated APs 202a-202n includes multiple antennas 204a-204n, multiple RF transceivers 209a-209n, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202a-202n may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202a-202n.

For each affiliated AP 202a-202n, the RF transceivers 209a-209n receive, from the antennas 204a-204n, incoming RF signals, such as signals transmitted by STAs in the network 100. In some embodiments, each affiliated AP 202a-202n operates at a different bandwidth, e.g., 2.4 GHz, 5 GHz, or 6 GHz, and accordingly the incoming RF signals received by each affiliated AP may be at a different frequency of RF. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202a-202n, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-convert the baseband or IF signals to RF signals that are transmitted via the antennas 204a-204n. In embodiments wherein each affiliated AP 202a-202n operates at a different bandwidth, e.g., 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including facilitating the coexistence of TWT operation and EMLSR operation for MLDs in a WLAN when multiple TWT schedules are established on multiple links between an AP MLD and a non-AP MLD. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for facilitating the coexistence of TWT operation and EMLSR operation for MLDs in a WLAN when multiple TWT schedules are established on multiple links between an AP MLD and a non-AP MLD. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202a-202n is shown as including a single instance of TX processing circuitry 214 and a single instance of RX processing circuitry 219, the AP MLD 101 could include multiple instances of each (such as one per RF transceiver) in one or more of the affiliated APs 202a-202n. Alternatively, only one antenna and RF transceiver path may be included in one or more of the affiliated APs 202a-202n, such as in legacy APs. Also, various components in FIG. 2A could be combined, further subdivided, or omitted and additional components could be added according to particular needs.

Figure 2B:
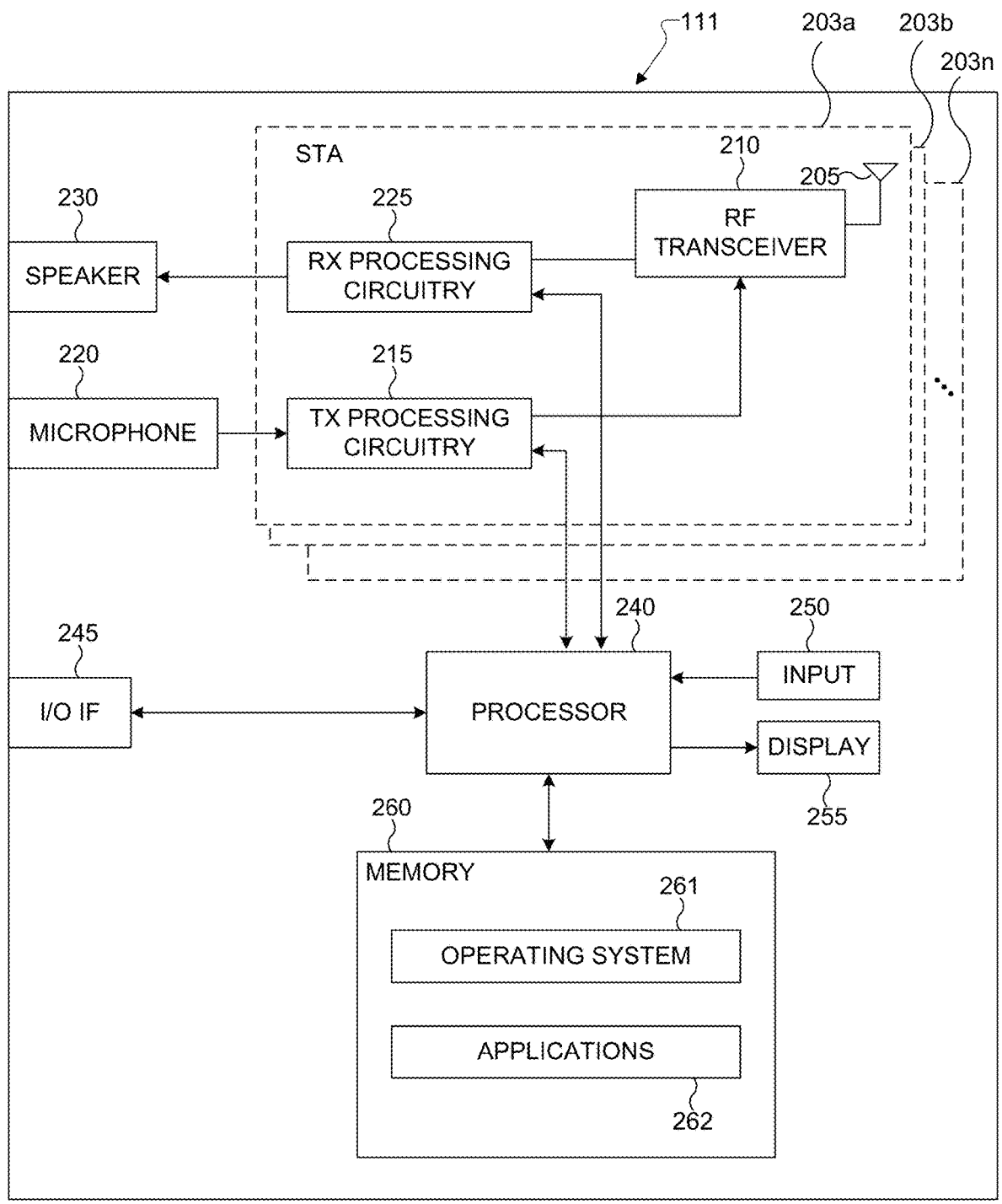
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203a-203n (which may be referred to, for example, as STA1-STAn). Each of the affiliated STAs 203a-203n includes antenna(s) 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203a-203n may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203a-203n.

For each affiliated STA 203a-203n, the RF transceiver 210 receives, from the antenna(s) 205, an incoming RF signal transmitted by an AP of the network 100. In some embodiments, each affiliated STA 203a-203n operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203a-203n, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205. In embodiments wherein each affiliated STA 203a-203n operates at a different bandwidth, e.g., 2.4 GHz, 5 GHz, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to facilitate the coexistence of TWT operation and EMLSR operation for MLDs in a WLAN when multiple TWT schedules are established on multiple links between an AP MLD and a non-AP MLD. In some embodiments, the controller/processor 240 includes at least one microprocessor or microcontroller.

The controller/processor 240 is also capable of executing other processes and programs resident in the memory 260, such as operations for facilitating the coexistence of TWT operation and EMLSR operation for MLDs in a WLAN when multiple TWT schedules are established on multiple links between an AP MLD and a non-AP MLD. The controller/processor 240 can move data into or out of the memory 260 as required by an executing process. In some embodiments, the controller/processor 240 is configured to execute a plurality of applications 262, such as applications for facilitating the coexistence of TWT operation and EMLSR operation for MLDs in a WLAN when multiple TWT schedules are established on multiple links between an AP MLD and a non-AP MLD. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203a-203n may include any number of antenna(s) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

If a non-AP MLD intends to operate in EMLSR mode with its associated AP MLD, a STA affiliated with the non-AP MLD sends an EML Operating Mode Notification frame (EOMNF) to its associated AP affiliated with the AP MLD, where the EMLSR Mode subfield in the EML Control field in the EML Operating Mode Notification frame is set to 1.

Upon receiving the EML Operating Mode Notification frame from the non-AP MLD, the AP MLD can send, on any enabled link between the AP MLD and the non-AP MLD, another EML Operating Mode Notification frame, where the EMLSR Mode subfield in the EML Control field in the EML Operating Mode Notification frame is set to 1. The AP affiliated with the AP MLD is expected to send the EML Operating Mode Notification frame in response to the EML Operating Mode Notification frame sent by a STA affiliated with the non-AP MLD within the timeout interval indicated in the Transition Timeout subfield in the EML Capabilities subfield in the Basic Variant Multi-Link element that is most recently exchanged between the AP MLD and the non-AP MLD.

The non-AP MLD transitions to EMLSR mode immediately after receiving the EML Operating Mode Notification frame with EMLSR Mode subfield in EML Control field set to 1 from an AP affiliated with the AP MLD, or immediately after the timeout interval indicated in the Transition Timeout subfield in the EML Capabilities field in the Basic Variant Multi-Link element elapses after the end of the last physical layer protocol data unit (PPDU) contained in the EML Operating Mode Notification frame transmitted by the non-AP MLD, whichever occurs first. Upon transitioning into the EMLSR mode of operation, all STAs affiliated with the non-AP MLD transition to active mode (listening mode).

Figure 3:
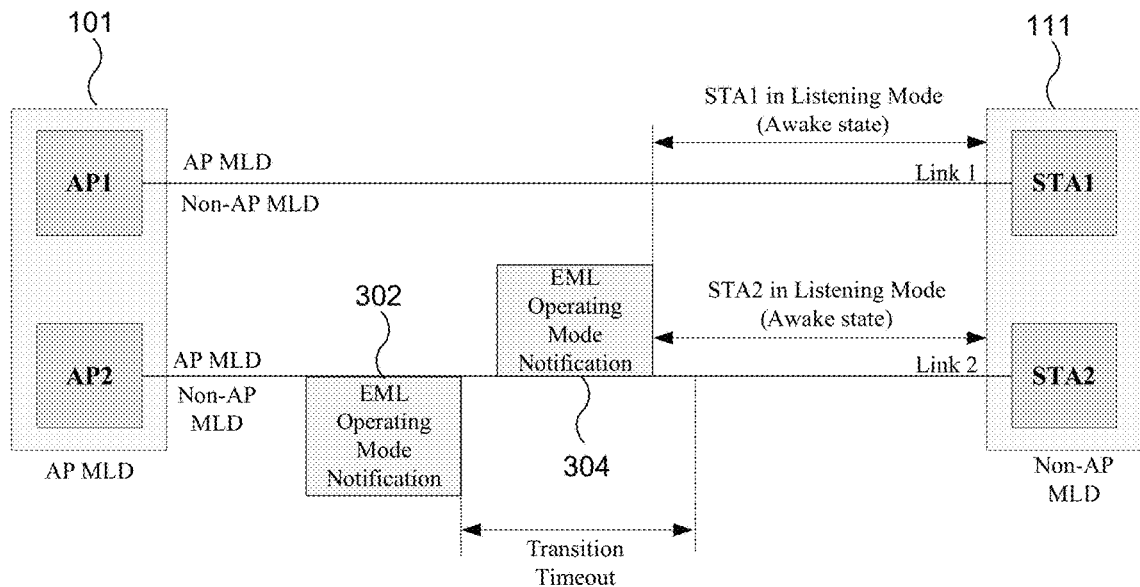
FIG. 3 illustrates an example of EMLSR operation according to embodiments of the present disclosure.

FIG. 3 illustrates an example of EMLSR operation according to embodiments of the present disclosure. In this example, the AP MLD may be an AP MLD 101, and the non-AP MLD may be a non-AP MLD 111. Although the AP MLD 101 is illustrated with two affiliated APs (AP1 and AP2) and the non-AP MLD 111 is illustrated as a single radio non-AP MLD with two affiliated non-AP STAs (STA1 and STA2), it is understood that this process could be applied with suitable MLDs having any number of affiliated APs or STAs. For ease of explanation, it is understood that references to an AP MLD and a non-AP MLD in further embodiments below refer to the AP MLD 101 and non-AP MLD 111, respectively.

In the example of FIG. 3, two links are set up between the AP MLD and the non-AP MLD—Link 1 between AP1 and STA1, and Link 2 between AP2 and STA2. Moreover, in this example, both Link 1 and Link 2 are enabled links. The non-AP MLD intends to transition to EMLSR mode, and accordingly, STA2 sends to AP2 over Link 2 an EML Operating Mode Notification frame 302 with EMLSR Mode subfield in EML Control field set to 1. In response to the EML Operating Mode Notification frame 302 transmitted by the non-AP MLD, AP2 sends to STA2 another EML Operating Mode Notification frame 304 with EMLSR Mode subfield in EML Control field set to 1. After receiving the EML Operating Mode Notification frame 304 from the AP MLD, the non-AP MLD transitions into EMLSR mode, and both STA1 and STA2 transition into listening mode.

In the various embodiments of the present disclosure discussed herein below, for ease of explanation an AP MLD is described as selecting an EMLSR link on which to initiate a frame exchange with a non-AP MLD. It is understood that in these embodiments the non-AP MLD may select the EMLSR link on which to initiate the frame exchange with the AP MLD.

According to some embodiments, for the scenario in which multiple TWT agreements or TWT schedules are established on multiple links between an AP MLD and a non-AP MLD, if those links are also included in the EMLSR links and if the TWT SPs on the respective links start at the same time or similar time and if, while operating in the EMLSR mode, no complete frame exchange in one TWT SP is possible without overlapping another TWT SP on another link, then upon the non-AP MLD transitioning into EMLSR mode of operation, which link, out of the links on which the TWT schedules or agreements are set up, is selected by the AP for sending the EMLSR initial control frame depends on the priority of the traffic intended for transmission on the respective links. This prioritization can be based on the latency-sensitivity of the corresponding traffic.

Figure 4:
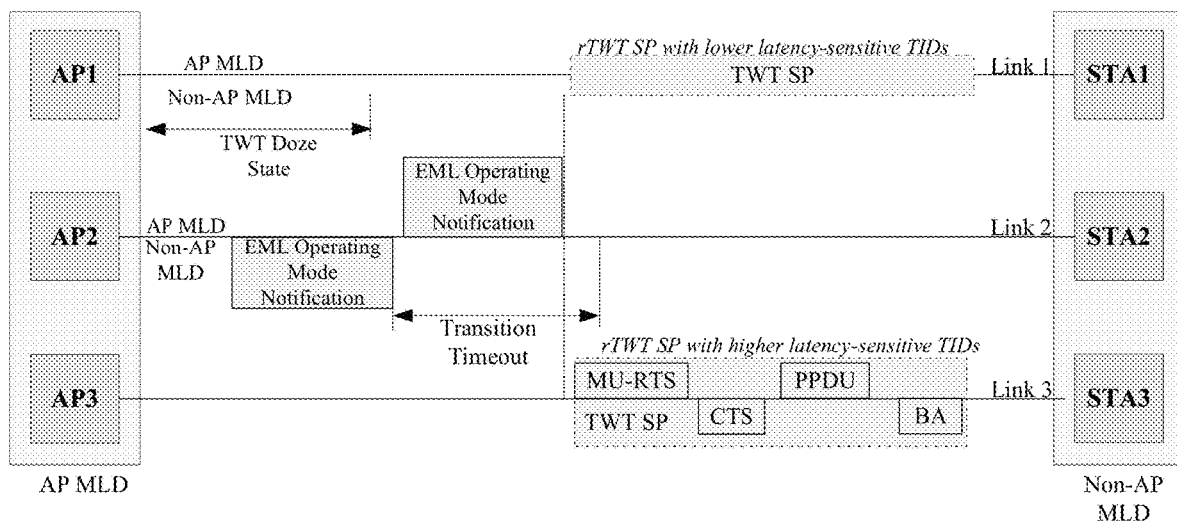
FIG. 4 illustrates an example of selection of a link for EMLSR frame exchange based on a TWT SP having higher priority TIDs according to embodiments of the present disclosure.

FIG. 4 illustrates an example of selection of a link for EMLSR frame exchange based on a TWT SP having higher priority TIDs according to embodiments of the present disclosure. In this example, although the AP MLD is illustrated with three affiliated APs (AP1, AP2, and AP3) and the non-AP MLD is illustrated with three affiliated non-AP STAs (STA1, STA2, and STA3), it is understood that this process could be applied with suitable MLDs having any number of affiliated APs or STAs.

After the transition to EMLSR mode of operation in the example of FIG. 4, restricted TWT agreements are set up on Link 1 and Link 3, and the TWT SPs overlap. The link on which the traffic with higher priority traffic identifiers (TIDs) is intended for transmission during the TWT SP will be chosen for transmitting the EMLSR initial control frames by the AP. That is, upon the non-AP MLD transitioning into EMLSR mode of operation, the EMLSR initial control frame will be sent on the link for which higher priority TIDs are mapped to the restricted TWT SP according to the restricted TWT setup procedure. In this example, Link 3 has higher priority TIDs mapped to it (that is, TIDs that are more latency-sensitive), so Link 3 is selected for the EMLSR initial control frame.

According to another embodiment, for the scenario in which one or more individual TWT agreements or broadcast TWT schedules, which are not restricted TWT schedules, are established on one or multiple links between an AP MLD and a non-AP MLD and one or more restricted TWT schedules are also established on one or multiple links between the same AP MLD and the non-AP MLD, if all those links are also included in the EMLSR links and if the TWT SPs on the respective links start at the same time or similar time and if, while operating in the EMLSR mode, no complete frame exchange in one TWT SP is possible without overlapping another TWT SP on another link, then upon the non-AP MLD transitioning into the EMLSR mode of operation, for transmitting the EMLSR initial control frame by an AP affiliated with the AP MLD, links corresponding to restricted TWT schedules are prioritized over the other links corresponding to individual TWT agreements or broadcast TWT schedules that are not restricted TWT schedules.

Figure 5:
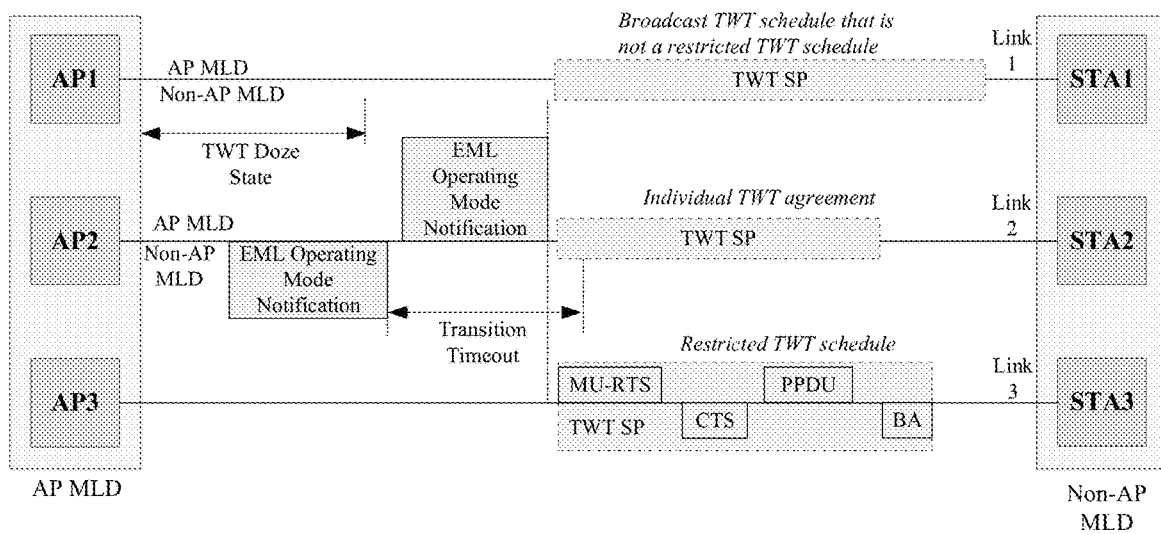
FIG. 5 illustrates an example of prioritization of links having restricted TWT schedules over individual TWT schedules or broadcast TWT schedules for EMLSR initial frame exchange according to embodiments of the present disclosure.

FIG. 5 illustrates an example of prioritization of links having restricted TWT schedules over individual TWT schedules or broadcast TWT schedules for EMLSR initial frame exchange according to embodiments of the present disclosure. In this example, although the AP MLD is illustrated with three affiliated APs (AP1, AP2, and AP3) and the non-AP MLD is illustrated with three affiliated non-AP STAs (STA1, STA2, and STA3), it is understood that this process could be applied with suitable MLDs having any number of affiliated APs or STAs.

After the transition to EMLSR mode of operation in the example of FIG. 5, a broadcast TWT schedule (that is not a restricted TWT schedule) is set up on Link 1, an individual TWT agreement is set up on Link 2, and a restricted TWT schedule is set up on Link 3. Link 3 is prioritized due to the restricted TWT schedule and is selected for the EMLSR initial control frame.

According to another embodiment, for the scenario in which multiple TWT agreements or TWT schedules are established on multiple links between an AP MLD and a non-AP MLD, if those links are also included in the EMLSR links and if the TWT SPs on the respective links start at the same time or similar time and if, while operating in the EMLSR mode, no complete frame exchange in one TWT SP is possible without overlapping another TWT SP on another link, then upon the non-AP MLD transitioning into the EMLSR mode of operation, if the AP MLD chooses one link for EMLSR initial frame exchange during the TWT SP on that link, then the STAs affiliated with the non-AP MLD and operating on the other links can remain in the doze state during the respective TWT SPs on those links.

Figure 6:
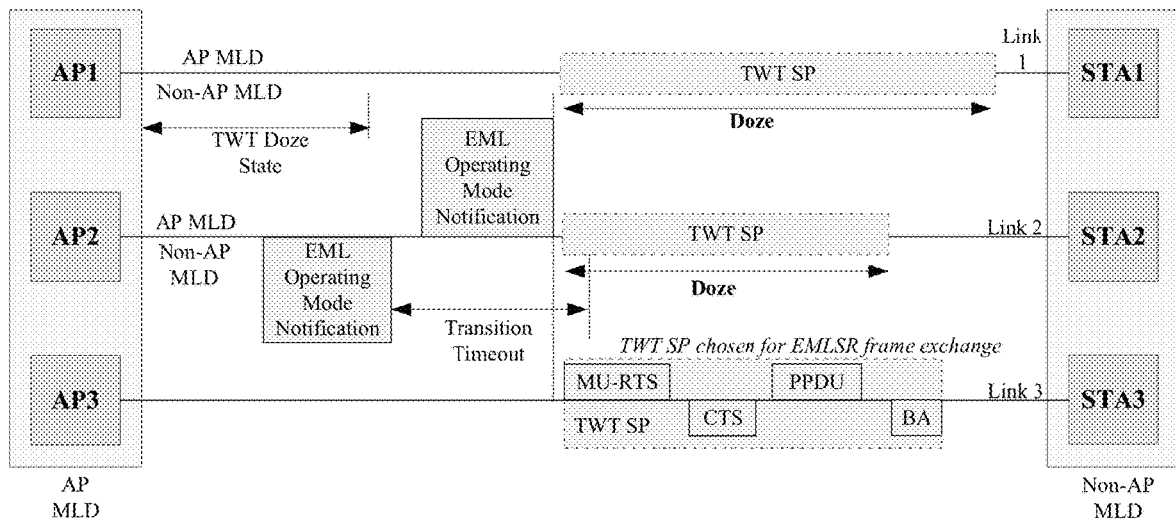
FIG. 6 illustrates an example of STAs remaining in doze state during a TWT SP when another TWT SP on another link is chosen for EMLSR frame exchange according to embodiments of the present disclosure.

FIG. 6 illustrates an example of STAs remaining in doze state during a TWT SP when another TWT SP on another link is chosen for EMLSR frame exchange according to embodiments of the present disclosure. In this example, although the AP MLD is illustrated with three affiliated APs (AP1, AP2, and AP3) and the non-AP MLD is illustrated with three affiliated non-AP STAs (STA1, STA2, and STA3), it is understood that this process could be applied with suitable MLDs having any number of affiliated APs or STAs.

After the transition to EMLSR mode of operation in the example of FIG. 6, Link 3 is selected for EMLSR initial frame exchange during its TWT SP. Link 1 and Link 2 have TWT SPs that overlap with the TWT SP of Link 3. Accordingly, STA1 is able to remain in doze state for the duration of the TWT SP of Link 1, and STA2 is able to remain in doze state for the duration of the TWT SP of Link 2.

According to another embodiment, for the scenario in which multiple TWT agreements or TWT schedules are established on multiple links between an AP MLD and a non-AP MLD, if those links are also included in the EMLSR links and if the TWT service period (SP) on one link (e.g., the first link) starts significantly earlier than the TWT SPs on the other links, and if while operating in the EMLSR mode, no complete frame exchange in one TWT SP is possible without overlapping another TWT SP on another link, then upon the non-AP MLD transitioning into the EMLSR mode of operation, the AP MLD selects the first link for initiating the EMLSR frame exchange sequence if the traffic priority of the first link during its TWT SP is greater than or equal to the traffic priority on the other links during their respective TWT SPs.

Figure 7:
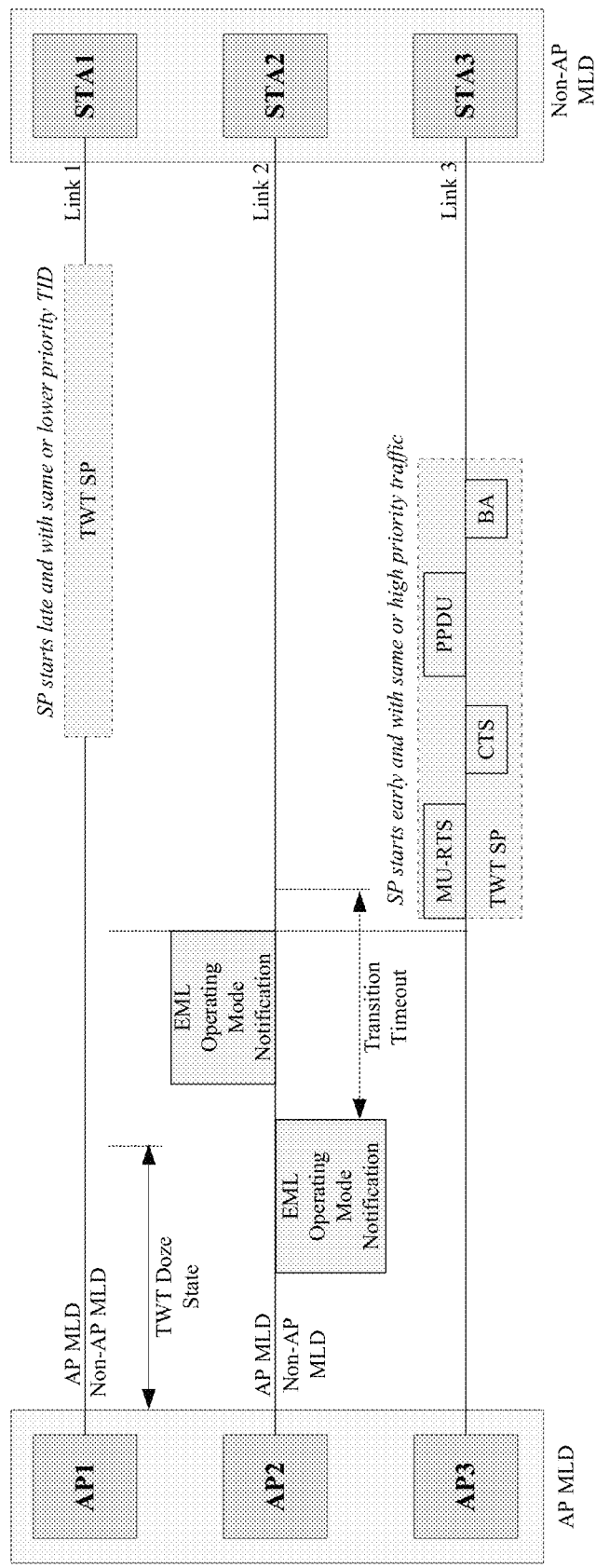
FIG. 7 illustrates an example of prioritization, for EMLSR frame exchange, of a link having a TWT SP that starts earlier and is for higher priority traffic than the TWT SPs on the other links according to embodiments of the present disclosure.

FIG. 7 illustrates an example of prioritization, for EMLSR frame exchange, of a link having a TWT SP that starts earlier and is for higher priority traffic than the TWT SPs on the other links according to embodiments of the present disclosure. In this example, although the AP MLD is illustrated with three affiliated APs (AP1, AP2, and AP3) and the non-AP MLD is illustrated with three affiliated non-AP STAs (STA1, STA2, and STA3), it is understood that this process could be applied with suitable MLDs having any number of affiliated APs or STAs.

After the transition to EMLSR mode of operation in the example of FIG. 7, the TWT SP of Link 3 starts earlier than the TWT SP of Link 1, and Link 3 has higher priority traffic than Link 1 (e.g., the priority of TIDs mapped to Link 3 is higher than the priority of TIDs mapped to Link 1). Accordingly, Link 3 is selected for EMLSR initial frame exchange.

According to another embodiment, for the scenario in which multiple TWT agreements or TWT schedules are established on multiple links between an AP MLD and a non-AP MLD, if those links are also included in the EMLSR links and if the TWT service period (SP) on one link (e.g., the first link) starts significantly later than the TWT SPs on the other links, and if, while operating in the EMLSR mode, no complete frame exchange in one TWT SP is possible without overlapping another TWT SP on another link, then upon the non-AP MLD transitioning into the EMLSR mode of operation, the AP MLD selects the first link for initiating the EMLSR frame exchange sequence if the traffic priority of the first link during its TWT SP is greater than the traffic priority on the other links during their respective TWT SPs.

Figure 8:
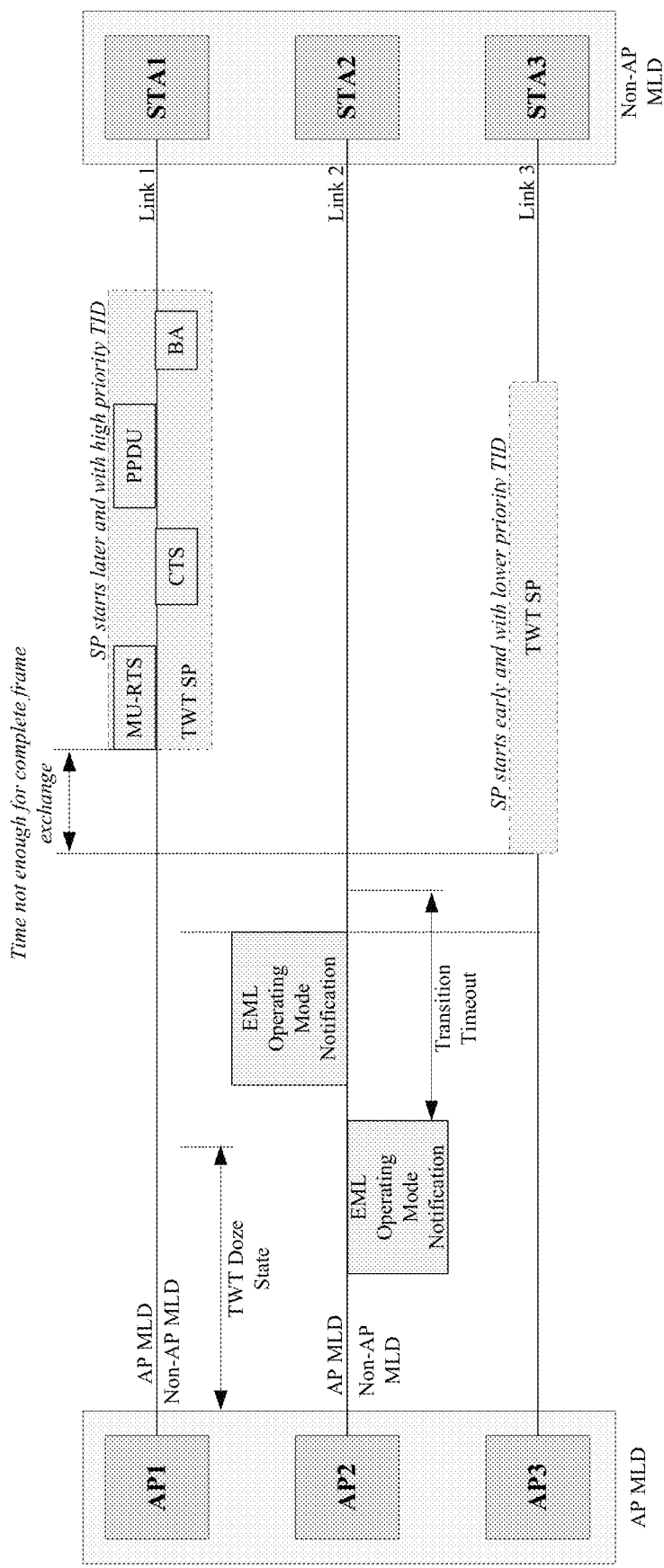
FIG. 8 illustrates an example of prioritization, for EMLSR frame exchange, of a TWT SP that starts later but is for higher priority traffic than the TWT SPs on other links according to embodiments of the present disclosure.

FIG. 8 illustrates an example of prioritization, for EMLSR frame exchange, of a TWT SP that starts later but is for higher priority traffic than the TWT SPs on other links according to embodiments of the present disclosure. In this example, although the AP MLD is illustrated with three affiliated APs (AP1, AP2, and AP3) and the non-AP MLD is illustrated with three affiliated non-AP STAs (STA1, STA2, and STA3), it is understood that this process could be applied with suitable MLDs having any number of affiliated APs or STAs.

After the transition to EMLSR mode of operation in the example of FIG. 8, the TWT SP of Link 1 starts later than the TWT SP of Link 3, but Link 1 has higher priority traffic than Link 3 (e.g., the priority of TIDs mapped to Link 1 is higher than the priority of TIDs mapped to Link 3). Accordingly, Link 1 is selected for EMLSR initial frame exchange.

According to another embodiment, for the scenario in which multiple TWT agreements or TWT schedules are established on multiple links between an AP MLD and a non-AP MLD, if those links are also included in the EMLSR links and if the TWT service period (SP) on one link (e.g., the first link) starts significantly earlier than another TWT SP on another link (e.g., the second link) and if, while operating in the EMLSR mode, it is possible to have a complete frame exchange during the TWT SP on the first link (which includes, in some embodiments, enough time to complete an EMLSR Transition Delay) before the TWT SP starts on the second link, then upon the non-AP MLD transitioning into the EMLSR mode of operation, the AP MLD selects the first link for initiating the EMLSR frame exchange sequence regardless of how the traffic priority on the first link during its TWT SP compares to the traffic priority on the second link during its TWT SP.

Figure 9:
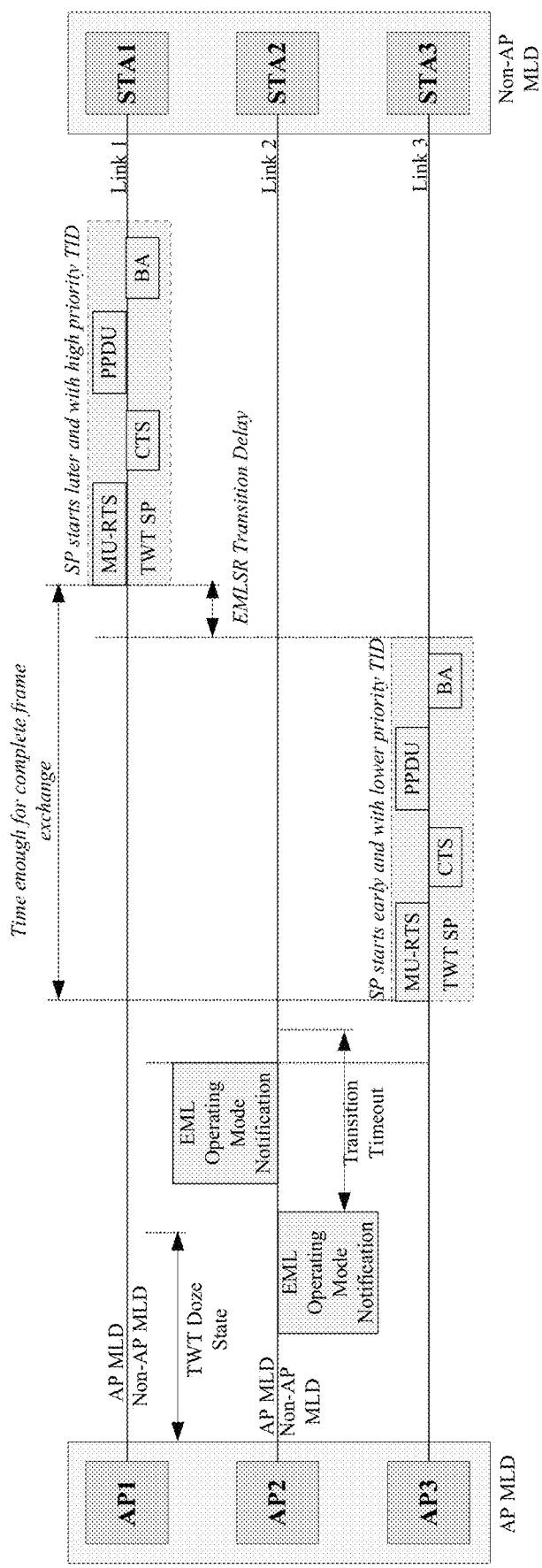
FIG. 9 illustrates an example of prioritization, for EMLSR frame exchange, of a TWT SP that starts earlier than other TWT SPs on other links such that a complete frame exchange is possible before any other TWT SP starts on another link according to embodiments of the present disclosure.

FIG. 9 illustrates an example of prioritization, for EMLSR frame exchange, of a TWT SP that starts earlier than other TWT SPs on other links such that a complete frame exchange is possible before any other TWT SP starts on another link according to embodiments of the present disclosure. In this example, although the AP MLD is illustrated with three affiliated APs (AP1, AP2, and AP3) and the non-AP MLD is illustrated with three affiliated non-AP STAs (STA1, STA2, and STA3), it is understood that this process could be applied with suitable MLDs having any number of affiliated APs or STAs.

After the transition to EMLSR mode of operation in the example of FIG. 9, the TWT SP of Link 3 starts earlier than the TWT SP of Link 1, and Link 3 has lower priority traffic than Link 1 (e.g., the priority of TIDs mapped to Link 1 is higher than the priority of TIDs mapped to Link 3). However, there is time for a frame exchange to be completed during the TWT SP of Link 3 (and time for an EMLSR Transition Delay to be completed) before the TWT SP of Link 1 begins. Accordingly, Link 3 is selected for EMLSR initial frame exchange.

In another scenario, multiple TWT agreements or TWT schedules are established on multiple links between an AP MLD and a non-AP MLD, those links are also included in the EMLSR links, and the TWT service period (SP) on one link (e.g., the first link) overlaps with the TWT SP on another link (e.g., the second link). Additionally, higher priority TIDs (traffic requiring lower latency) are mapped to the first link and lower priority TIDs are mapped to the second link for TWT operation. According to one embodiment, while operating in the EMLSR mode, if no complete frame exchange is possible in one TWT SP without overlapping the other TWT SP on the other link, and if the buffer corresponding to the higher priority traffic on the first link is empty but the buffer corresponding to the lower priority traffic is non-empty, then the AP MLD may transmit the EMLSR initial control frame on the second link to initiate the frame exchanges during the TWT SP on the first link.

In another scenario, one or more TWT agreements or TWT schedules are established on one or multiple links between an AP MLD and a non-AP MLD, and those links are also included in the EMLSR links. Additionally, higher priority TIDs (traffic requiring lower latency) are mapped to a link that doesn't have any TWT schedule/agreement established, and only lower priority TIDs are mapped to the links on which the TWT schedules/agreements are established. According to one embodiment, while operating in the EMLSR mode, if no complete frame exchange is possible on one link without overlapping any of the TWT SPs on any of the other links, then the AP MLD may transmit the EMLSR initial control frame on the first link to which higher priority TIDs are mapped but no TWT SP is established.

According to another embodiment, for the scenario in which multiple TWT agreements or TWT schedules are established on multiple links between an AP MLD and a non-AP MLD, those links are also included in the EMLSR links, and the TWT service period (SP) on one link (e.g., the first link) overlaps, in time, with the TWT SP on another link (e.g., the second link), if the non-AP MLD is already operating in EMLSR mode, then the non-AP MLD disables the EMLSR mode before the overlapping TWT SP starts on either of the links.

Figure 10:
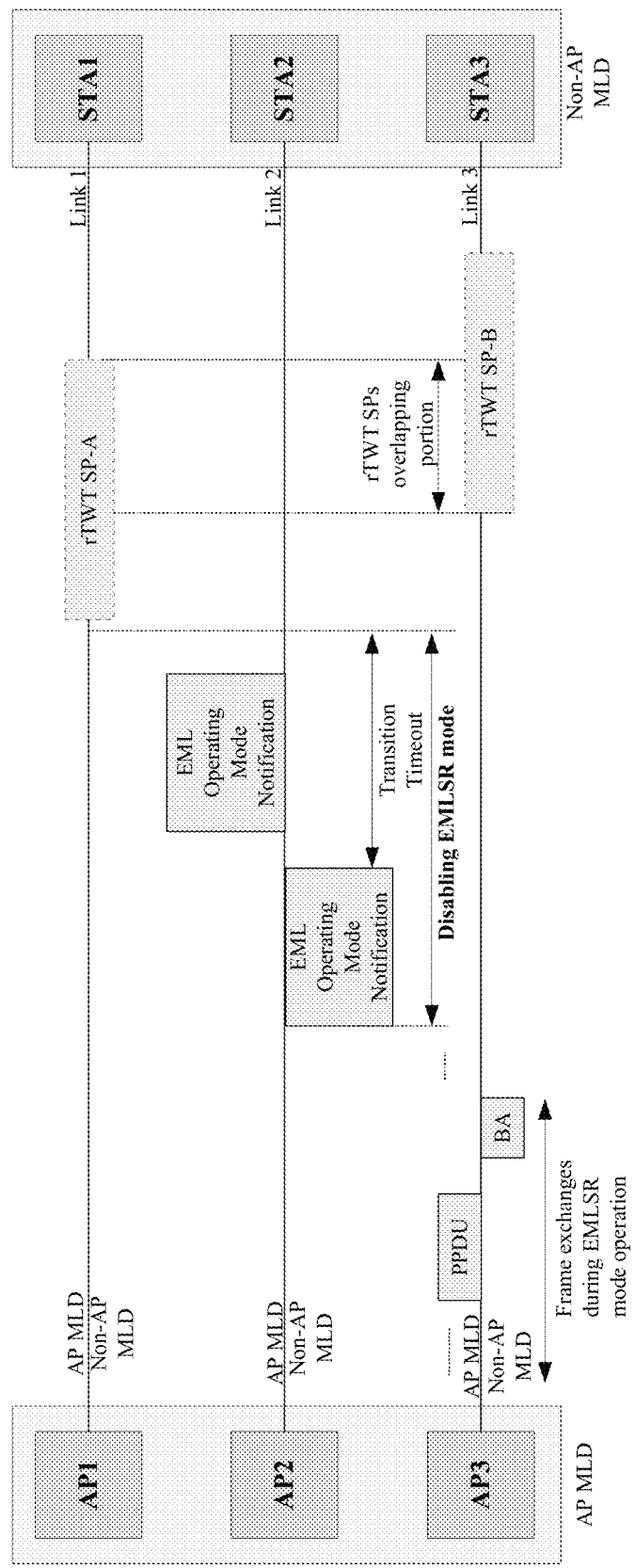
FIG. 10 illustrates an example of disabling EMLSR mode before an overlapping TWT SP starts on any of the links according to embodiments of the present disclosure.

FIG. 10 illustrates an example of disabling EMLSR mode before an overlapping TWT SP starts on any of the links according to embodiments of the present disclosure. In this example, although the AP MLD is illustrated with three affiliated APs (AP1, AP2, and AP3) and the non-AP MLD is illustrated with three affiliated non-AP STAs (STA1, STA2, and STA3), it is understood that this process could be applied with suitable MLDs having any number of affiliated APs or STAs.

According to another embodiment, for the scenario in which multiple TWT agreements or TWT schedules are established on multiple links between an AP MLD and a non-AP MLD, those links are also included in the EMLSR links, and the TWT service period (SP) on one link (e.g., the first link) overlaps, in time, with TWT SP on another link (e.g., the second link), if the non-AP MLD is not operating in EMLSR mode, then the non-AP MLD does not activate EMLSR mode.

According to another embodiment, for the scenario in which multiple restricted TWT schedules are established on multiple links between an AP MLD and a non-AP MLD, if those links are also included in the EMLSR links and if the restricted TWT service period (SP) on one link (e.g., a first link) overlaps completely, in time (i.e., has the same start and end time), with a restricted TWT SP on another link (e.g., a second link), and if the same set of TIDs negotiated for the restricted TWT SP on the first link is also negotiated for the restricted TWT SP on the second link, then upon the non-AP MLD transitioning into the EMLSR mode, the AP MLD can select either one of the links (e.g., the second link) for EMLSR frame exchanges and the STA affiliated with the non-AP MLD and operating on the other link (e.g., the first link) can remain in doze state during the restricted TWT SP on the first link.

Figure 11:
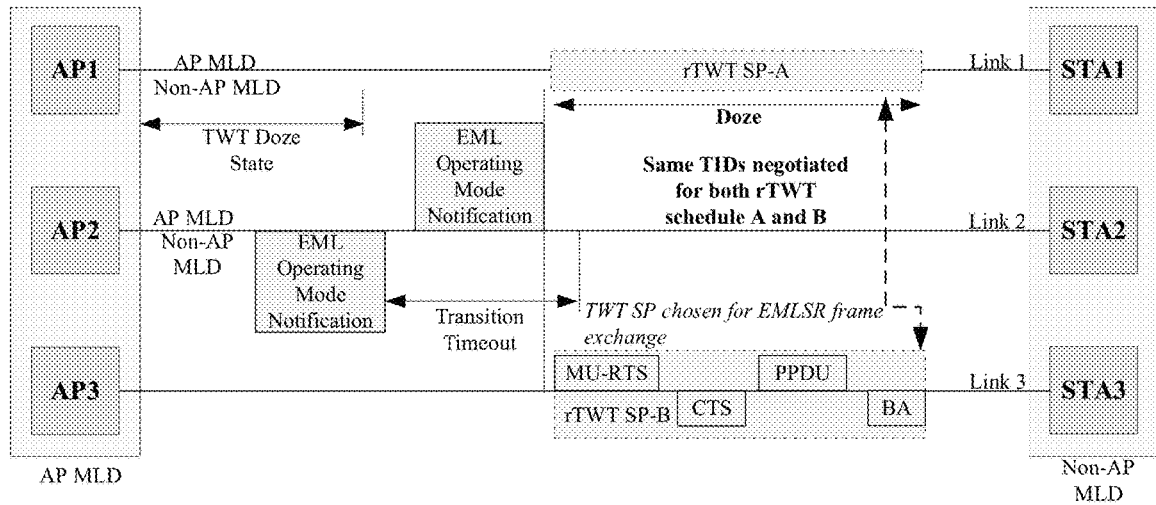
FIG. 11 illustrates an example of selecting a single one of two overlapping restricted TWT SPs for EMLSR frame exchange when the TIDs negotiated for that restricted TWT SP are also negotiated for the other restricted TWT SP on another link according to embodiments of the present disclosure.

FIG. 11 illustrates an example of selecting a single one of two overlapping restricted TWT SPs for EMLSR frame exchange when the TIDs negotiated for that restricted TWT SP are also negotiated for the other restricted TWT SP on another link according to embodiments of the present disclosure. In this example, although the AP MLD is illustrated with three affiliated APs (AP1, AP2, and AP3) and the non-AP MLD is illustrated with three affiliated non-AP STAs (STA1, STA2, and STA3), it is understood that this process could be applied with suitable MLDs having any number of affiliated APs or STAs.

After the transition to EMLSR mode of operation in the example of FIG. 11, the restricted TWT SP of Link 1 (rTWT SP-A) has the same start and end time as the restricted TWT SP of Link 3 (rTWT SP-B), and the same TIDs are negotiated for both rTWT SP-A and rTWT SP-B. Accordingly, the AP MLD can select either Link 1 or Link 3 to initiate an EMLSR frame exchange. In this example, the AP MLD selects Link 3 and sends the EMLSR initial control frames during rTWT SP-B on Link 3. STA1 affiliated with the non-AP MLD and operating on Link 1 remains in doze state during rTWT SP-A.

According to another embodiment, for the scenario in which multiple restricted TWT schedules are established on multiple links between an AP MLD and a non-AP MLD, if those links are also included in the EMLSR links and if the restricted TWT service period (SP) on one link (e.g., the first link) overlaps partially, in time, with a restricted TWT SP on another link (e.g., the second link) such that the restricted TWT SP on the second link starts earlier than the restricted TWT SP on the first link and the restricted TWT SPs on both links end at the same time, and if the same set of TIDs negotiated for the restricted TWT SP on the first link is also negotiated for the restricted TWT SP on the second link, then upon the non-AP MLD transitioning into the EMLSR mode, the AP MLD selects the second link for EMLSR frame exchanges, and the STA affiliated with the non-AP MLD and operating on the other link (e.g., the first link) can remain in doze state during the restricted TWT SP on the first link.

According to another embodiment, for the scenario in which multiple restricted TWT schedules are established on multiple links between an AP MLD and a non-AP MLD and those links are also included in the EMLSR links, if the restricted TWT service period (SP) on one link (e.g., the first link) overlaps partially, in time, with a restricted TWT SP on another link (e.g., the second link) such that the restricted TWT SP on the second link starts earlier than the restricted TWT SP on the first link but the restricted TWT SP on the first link ends later than the restricted TWT SP on the second link, and if the same set of TIDs negotiated for the restricted TWT SP on the first link is also negotiated for the restricted TWT SP on the second link, then upon the non-AP MLD transitioning into the EMLSR mode, the AP MLD can select the second link for EMLSR frame exchanges and the restricted TWT SP on the second link can be extended such that its end time is aligned with the end time of the restricted TWT SP on the first link. Upon reception of the initial control frame on the second link by the STA affiliated with the non-AP MLD and operating on the second link during the R-TWT SP on the second link, the STA affiliated with the non-AP MLD and operating on the first link can be in doze state during the R-TWT SP on the first link.

According to another embodiment, for the scenario in which multiple restricted TWT schedules are established on multiple links between an AP MLD and a non-AP MLD, those links are also included in the EMLSR links, and the TWT service period (SP) on one link (e.g., the first link) overlaps completely, in time (i.e., has the same start and end time), with a TWT SP on another link (e.g., the second link), if the same set of TIDs negotiated for the restricted TWT SP on the first link is not negotiated for the restricted TWT SP on the second link, then upon the non-AP MLD transitioning into the EMLSR mode, if the second link is selected by the AP operating on that link for EMLSR frame exchanges, frames corresponding to the TIDs (e.g., the first set of TIDs) negotiated for the restricted TWT SP on the first link can be transmitted during the restricted TWT SP on the second link along with the frames corresponding to the TIDs (e.g., the second set of TIDs) negotiated for the restricted TWT SP on the second link even if the first set of TIDs are not mapped to the second link through TID-to-Link mapping. The STA affiliated with the non-AP MLD and operating on the first link can be in doze state during the restricted TWT SP on the first link.

Figure 12:
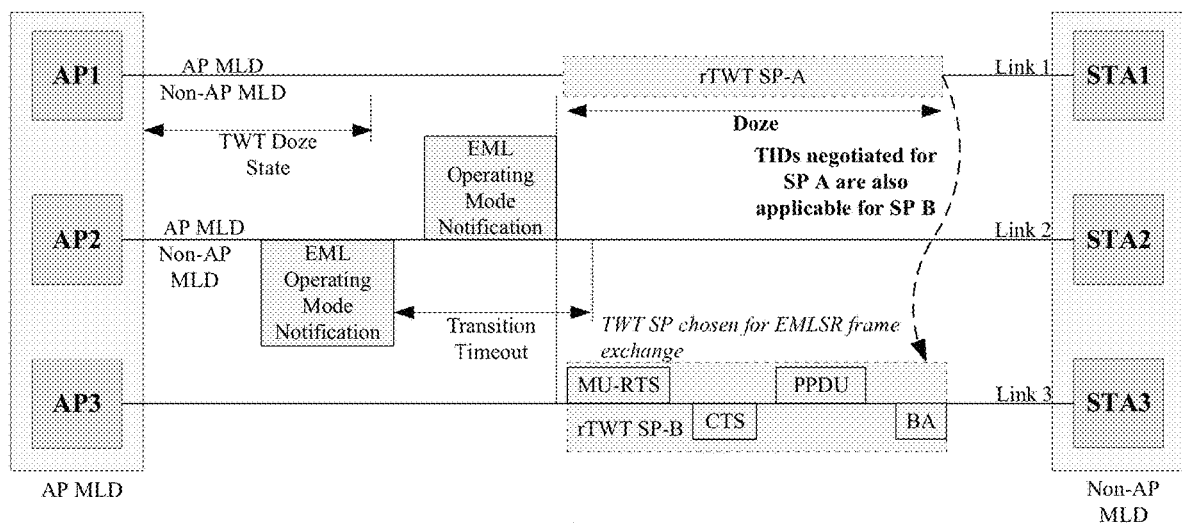
FIG. 12 illustrates an example of selecting a restricted TWT SP on one link for EMLSR frame exchange when TIDs negotiated for an overlapping restricted TWT SP on another link are also applicable for the restricted TWT SP on the selected link according to embodiments of the present disclosure.

FIG. 12 illustrates an example of selecting a restricted TWT SP on one link for EMLSR frame exchange when TIDs negotiated for an overlapping restricted TWT SP on another link are also applicable for the restricted TWT SP on the selected link according to embodiments of the present disclosure. In this example, although the AP MLD is illustrated with three affiliated APs (AP1, AP2, and AP3) and the non-AP MLD is illustrated with three affiliated non-AP STAs (STA1, STA2, and STA3), it is understood that this process could be applied with suitable MLDs having any number of affiliated APs or STAs.

After the transition to EMLSR mode of operation in the example of FIG. 12, the restricted TWT SP of Link 1 (rTWT SP-A) has the same start and end time as the restricted TWT SP of Link 3 (rTWT SP-B). A first set of TIDs are negotiated for rTWT SP-A and a second set of TIDs are negotiated for rTWT SP-B. Although the first set of TIDs are not negotiated for rTWT SP-B, the first set of TIDs are also applicable for rTWT SP-B. Accordingly, the AP MLD can select Link 3 for EMLSR frame exchange, and can transmit frames corresponding to both the first and second sets of TIDs during rTWT SP-B. Meanwhile, STA1 affiliated with the non-AP MLD and operating on Link 1 remains in doze state during rTWT SP-A.

According to another embodiment, when there is any broadcast TWT schedule, restricted TWT schedule, or individual TWT agreement established on any link between an AP MLD and a non-AP MLD, for operating in EMLSR mode, all TIDs that are mapped to the TWT links or that are negotiated for the restricted TWT operation will also be mapped to all EMLSR links. According to another embodiment, when there is any broadcast TWT schedule, restricted TWT schedule, or individual TWT agreement established on any link between an AP MLD and a non-AP MLD, for operating in EMLSR mode, the TID-to-Link mapping for the non-AP MLD will be the default TID-to-Link mapping.

According to another embodiment, for the scenario in which multiple restricted TWT schedules are established on multiple links between an AP MLD and a non-AP MLD and those links are also included in the EMLSR links, if the restricted TWT service period (SP) on one link (e.g., the first link) overlaps partially, in time, with a restricted TWT SP on another link (e.g., the second link) such that the restricted TWT SP on the second link starts earlier than the restricted TWT SP on the first link but the restricted TWT SP on the first link ends later than the restricted TWT SP on the second link, then upon the non-AP MLD transitioning into the EMLSR mode, the AP MLD selects the second link for EMLSR frame exchanges and the restricted TWT SP on the second link is extended such that its end time is aligned with the end time of the restricted TWT SP on the first link.

In this embodiment, the frames corresponding to the TIDs (e.g., the first set of TIDs) negotiated for the restricted TWT SP on the first link can be transmitted during the restricted TWT SP on the second link along with the frames corresponding to the TIDs (e.g., the second set of TIDs) negotiated for the restricted TWT SP on the second link even if the first set of TIDs are not mapped to the second link through TID-to-Link mapping. The STA affiliated with the non-AP MLD and operating on the first link can be in doze state during the restricted TWT SP on the first link.

Figure 13:
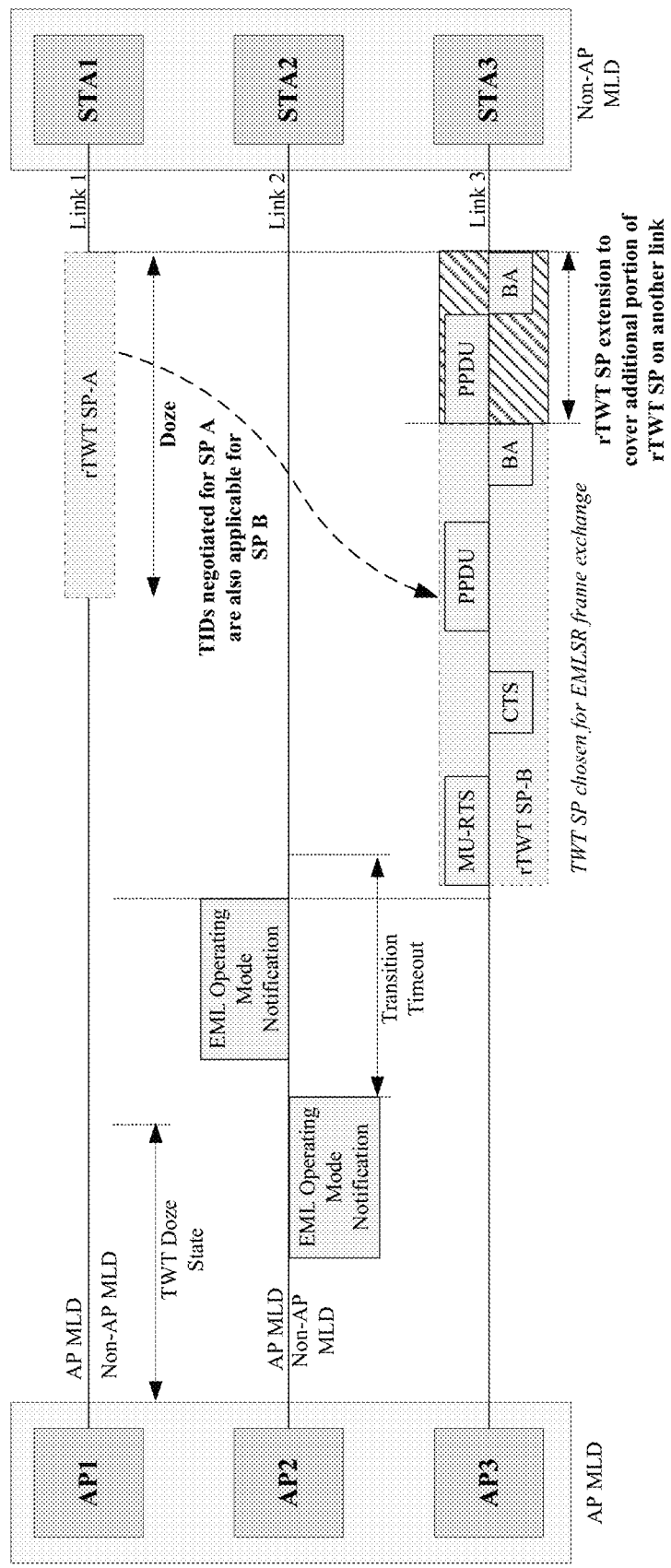
FIG. 13 illustrates an example of selecting a restricted TWT SP on one link for EMLSR frame exchange when TIDs negotiated for an overlapping restricted TWT SP on another link are also applicable for the restricted TWT SP on the selected link, and extending the selected restricted TWT SP according to embodiments of the present disclosure.

FIG. 13 illustrates an example of selecting a restricted TWT SP on one link for EMLSR frame exchange when TIDs negotiated for an overlapping restricted TWT SP on another link are also applicable for the restricted TWT SP on the selected link and extending the selected restricted TWT SP according to embodiments of the present disclosure. In this example, although the AP MLD is illustrated with three affiliated APs (AP1, AP2, and AP3) and the non-AP MLD is illustrated with three affiliated non-AP STAs (STA1, STA2, and STA3), it is understood that this process could be applied with suitable MLDs having any number of affiliated APs or STAs.

After the transition to EMLSR mode of operation in the example of FIG. 13, the restricted TWT SP of Link 1 (rTWT SP-A) overlaps with the restricted TWT SP of Link 3 (rTWT SP-B), such that rTWT SP-B starts earlier than rTWT SP-A and rTWT SP-A ends later than rTWT SP-B. A first set of TIDs are negotiated for rTWT SP-A and a second set of TIDs are negotiated for rTWT SP-B. Although the first set of TIDs are not negotiated for rTWT SP-B, the first set of TIDs are also applicable for rTWT SP-B. Accordingly, the AP MLD can select Link 3 for EMLSR frame exchange, and can transmit frames corresponding to both the first and second sets of TIDs during rTWT SP-B, while the end time of rTWT SP-B is extended to align with the end time of rTWT SP-A. Meanwhile, STA1 affiliated with the non-AP MLD and operating on Link 1 remains in doze state during rTWT SP-A.

Figure 14:
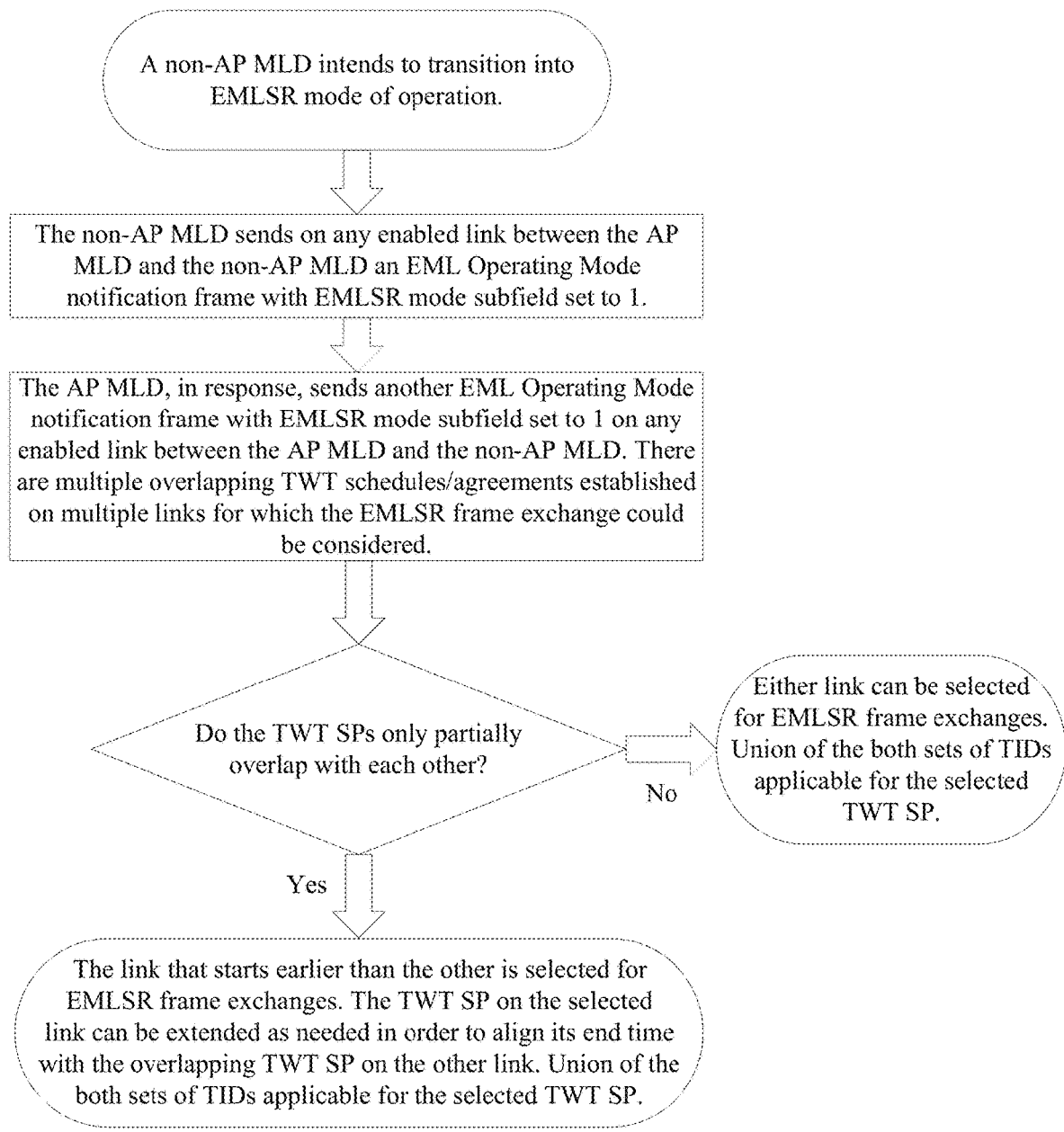
FIG. 14 illustrates an example procedure for TWT SP prioritization and extension for EMLSR frame exchanges according to embodiments of the present disclosure.

FIG. 14 illustrates an example procedure for TWT SP prioritization and extension for EMLSR frame exchanges according to embodiments of the present disclosure. The procedure of FIG. 14 may correspond to the examples illustrated in FIGS. 12 and 13.

According to another embodiment, a STA affiliated with a non-AP MLD can send a frame with an R-TWT Link Selection (RLS) subfield (or RLS Control subfield) to indicate the link on which the non-AP MLD intends to exchange frames during an r-TWT SP. For the RLS subfield, a value of a Control ID subfield of a Control subfield in a MAC frame can be 10 as shown in Table 1. Other values from 11 to 14 are also possible.

TABLE 1

| Control ID value | Meaning | Length of Control Information subfield (bits) |
|---|---|---|
| 0 | Triggered response scheduling (TRS) | 26 |
| 1 | Operating mode (OM) | 12 |
| 2 | HE link adaptation (HLA) | 26 |
| 3 | Buffer status report (BSR) | 26 |
| 4 | UL power headroom (UPH) | 8 |
| 5 | Bandwidth query report (BQR) | 10 |
| 6 | Command and status (CAS) | 8 |
| 7 | EHT operating mode (EHTOM) | 6 |
| 8 | Single response scheduling (SRS) | 10 |
| 9 | AP assistance request (AAR) | 20 |
| 10 | R-TWT Link Selection (RLS) | 20 |
| 11-14 | Reserved | |
| 15 | Ones need expansion surely (ONES) | 26 |

Figure 15:
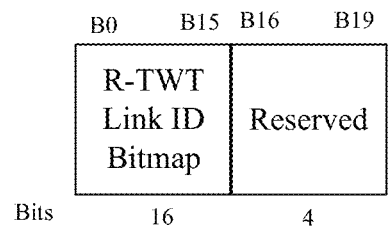
FIG. 15 illustrates an example format of a Control Information subfield of an RLS subfield according to embodiments of the present disclosure.

FIG. 15 illustrates an example format of a Control Information subfield of an RLS subfield according to embodiments of the present disclosure. In the example of FIG. 15, the R-TWT Link ID Bitmap subfield indicates the links (Link IDs) on which the MLD that transmits the subfield intends to exchange frames during r-TWT SPs on the corresponding links. According to one embodiment, the maximum number of bits that can be set to 1 in the R-TWT Link ID Bitmap subfield of the RLS subfield is one. That is, more than one link may not be indicated in the RLS subfield. According to another embodiment, more than one link may be indicated in the RLS subfield. In this case, more than one bit in the R-TWT Link ID Bitmap subfield of the RLS Control subfield can be set to 1.

Figure 16:
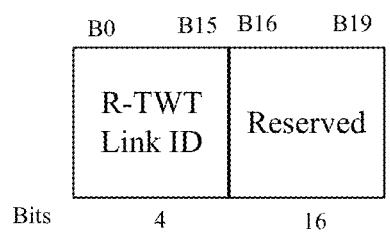
FIG. 16 illustrates another example format of a Control Information subfield of an RLS subfield according to embodiments of the present disclosure.

FIG. 16 illustrates another example format of a Control Information subfield of an RLS subfield according to embodiments of the present disclosure. In the example of FIG. 16, the R-TWT Link ID subfield indicates the link on which the MLD that transmits the subfield intends to exchange frames during the r-TWT SP on the corresponding link. The Reserved subfield can also be 4 or 8 bits long.

According to some embodiments, when a non-AP MLD is operating in EMLSR mode with an AP MLD and multiple r-TWT schedules are established on multiple links between the AP MLD and the non-AP MLD, if those links are also included in the EMLSR links and if the r-TWT SP on one link overlaps, in time, with the r-TWT SP on another link, then a STA affiliated with the non-AP MLD, before any of the overlapping r-TWT SPs starts on any link, can send a frame including an RLS subfield to its associated AP affiliated with the AP MLD to indicate the link that the non-AP MLD elects for frame exchange during the r-TWT SP. The non-AP MLD can indicate the chosen link, among the links that contain the overlapping r-TWT SPs, for which the non-AP MLD intends to exchange frames during the r-TWT SP on the chosen link. According to one embodiment, the non-AP MLD can remain in EMLSR mode while making such an indication through the RLS subfield.

According to one embodiment, in the overlapping r-TWT SP situation described above, the non-AP MLD sets one bit in the R-TWT Link ID Bitmap to 1 to indicate one link for frame exchange during the r-TWT SP. According to one embodiment, the chosen link can be from the links that have r-TWT SPs that overlap in time. According to another embodiment, the chosen link can be from another link without an overlapping r-TWT SP.

According to one embodiment, in the overlapping SP situation described above, the non-AP MLD can send the RLS subfield before any of the overlapping r-TWT SPs start on any of the links. According to one embodiment, the non-AP MLD can send the RLS subfield to indicate the chosen link among the links with overlapping r-TWT SPs during another r-TWT SP on any link before any of the overlapping r-TWT SPs start on any of the links between the AP MLD and the non-AP MLD. According to another embodiment, before any of the overlapping r-TWT SPs start on any of the links, the non-AP MLD can send the RLS subfield to the AP MLD outside of any r-TWT SP scheduled on any of the links between the AP MLD and the non-AP MLD.

According to one embodiment, the non-AP MLD can send the RLS subfield with any frame to its associated AP MLD over any enabled link between the AP MLD and the non-AP MLD. According to another embodiment, the non-AP MLD can send the RLS subfield with any frame to its associated AP MLD over any setup link between the AP MLD and the non-AP MLD.

According to one embodiment, the non-AP MLD sends the RLS subfield to indicate the chosen link, among the links with overlapping r-TWT SPs, for EMLSR frame exchange, and the RLS subfield can be sent during the r-TWT SP on any of the links with overlapping r-TWT SPs.

According to some embodiments, when a non-AP MLD is operating in EMLSR mode with an AP MLD and multiple R-TWT schedules are established on multiple links between the AP MLD and the non-AP MLD, and those links are also included in the EMLSR links, and the R-TWT SP on one link (e.g., a first link) overlaps, in time (either partially or completely), with the R-TWT SP on another link (e.g., a second link), if one or more TIDs that are negotiated for the R-TWT schedule on the first link are not negotiated for the R-TWT schedule on the second link, then the non-AP MLD, at least a duration of time indicated in the EMLSR Padding Delay subfield before the overlapping R-TWT SP starts on either of the links, shall transmit an RLS subfield in a frame to the AP MLD over any enabled link between the AP MLD and the non-AP MLD to indicate the link, between the two links on which the overlapping R-TWT SPs are scheduled, on which the non-AP MLD intends to exchange frames with the AP MLD during the corresponding R-TWT SP on the elected link. The R-TWT Link ID Bitmap subfield in the RLS subfield shall indicate the Link ID of the elected link by setting the corresponding bit position in the R-TWT Link ID Bitmap subfield to 1.

The AP MLD, upon reception of the indication of the link elected by the non-AP MLD using the RLS subfield, can send the subsequent initial control frame during the R-TWT SP on the link that is indicated in the R-TWT Link ID Bitmap subfield of the RLS subfield sent by the non-AP MLD. If the AP MLD sends the initial control frame on the second link during the R-TWT SP on the second link, the STA affiliated with the non-AP MLD and operating on the first link can be in doze state during the R-TWT SP on the first link. If the R-TWT SP on the second link ends earlier than the R-TWT SP on the first link, and if the AP MLD sends the initial control frame on the second link, then the R-TWT SP on the second link can be extended such that the R-TWT SP on the second link ends at the nominal end time of the R-TWT SP on the first link.

According to some embodiments, when a non-AP MLD is operating in EMLSR mode with an AP MLD and multiple R-TWT schedules are established on multiple links between the AP MLD and the non-AP MLD, and those links are also included in the EMLSR links, and the R-TWT SP on one link (e.g., a first link) overlaps, in time (either partially or completely), with the R-TWT SP on another link (e.g., a second link), if one or more TIDs that are negotiated for the R-TWT schedule on the second link are not negotiated for the R-TWT schedule on the first link, then the non-AP MLD, at least a duration of time indicated in the EMLSR Padding Delay subfield before the overlapping R-TWT SP starts on either of the links, shall transmit an RLS subfield in a frame to the AP MLD over any enabled link between the AP MLD and the non-AP MLD to indicate the link, between the two links on which the overlapping R-TWT SPs are scheduled, on which the non-AP MLD intends to exchange frames with the AP MLD during the corresponding R-TWT SP on the elected link. The R-TWT Link ID Bitmap subfield in the RLS subfield shall indicate the Link ID of the elected link by setting the corresponding bit position in the R-TWT Link ID Bitmap subfield to 1.

The AP MLD, upon reception of the indication of the link elected by the non-AP MLD using the RLS subfield, can send the subsequent initial control frame during the R-TWT SP on the link that is indicated in the R-TWT Link ID Bitmap subfield of the RLS subfield sent by the non-AP MLD. If the AP MLD sends the initial control frame on the second link during the R-TWT SP on the second link, the STA affiliated with the non-AP MLD and operating on the first link can be in doze state during the R-TWT SP on the first link. If the R-TWT SP on the second link ends earlier than the R-TWT SP on the first link, and if the AP MLD sends the initial control frame on the second link, then the R-TWT SP on the second link can be extended such that the R-TWT SP on the second link ends at the nominal end time of the R-TWT SP on the first link.

According to some embodiments, when a non-AP MLD is operating in EMLSR mode with an AP MLD and multiple R-TWT schedules are established on multiple links between the AP MLD and the non-AP MLD, and those links are also included in the EMLSR links, and the R-TWT SP on one link (e.g., a first link) overlaps, in time (either partially or completely), with the R-TWT SP on another link (e.g., a second link), if the set of TIDs that are negotiated for the R-TWT SP on the first link are different than the set of TIDs that are negotiated for the R-TWT SP on the second link, then the non-AP MLD, at least a duration of time indicated in the EMLSR Padding Delay subfield before the overlapping R-TWT SP starts on either of the links, shall transmit an RLS subfield in a frame to the AP MLD over any enabled link between the AP MLD and the non-AP MLD to indicate the link, between the two links on which the overlapping R-TWT SPs are scheduled, on which the non-AP MLD intends to exchange frames with the AP MLD during the corresponding R-TWT SP on the elected link. The R-TWT Link ID Bitmap subfield in the RLS subfield shall indicate the Link ID of the elected link by setting the corresponding bit position in the R-TWT Link ID Bitmap subfield to 1.

The AP MLD, upon reception of the indication of the link elected by the non-AP MLD using the RLS subfield, can send the subsequent initial control frame during the R-TWT SP on the link that is indicated in the R-TWT Link ID Bitmap subfield of the RLS subfield sent by the non-AP MLD. If the AP MLD sends the initial control frame on the second link during the R-TWT SP on the second link, the STA affiliated with the non-AP MLD and operating on the first link can be in doze state during the R-TWT SP on the first link. If the R-TWT SP on the second link ends earlier than the R-TWT SP on the first link, and if the AP MLD sends the initial control frame on the second link, the R-TWT SP on the second link can be extended such that the R-TWT SP on the second link ends at the nominal end time of the R-TWT SP on the first link.

According to some embodiments, support for the RLS operation can be optional for an MLD. According to one embodiment, RLS support can be indicated through an RLS Support subfield in the MLD Capabilities subfield in the Multi-Link element. According to one embodiment, an MLD that supports RLS operation can indicate such capability by setting the dot11RLSSupportOptionImplemented MIB variable to true.

According to another embodiment, the link selection indication for indicating one link among the overlapping r-TWT SP links can also be realized by repurposing the AAR support subfield. For example, before any of the overlapping r-TWT SPs start on any of the links, the non-AP MLD can indicate its elected link among the overlapping r-TWT SP links through the Assisting AP Link ID Bitmap subfield of the Control Information subfield of an AAR Control subfield sent by the non-AP MLD over any link between the AP MLD and the non-AP MLD.

Figure 17:
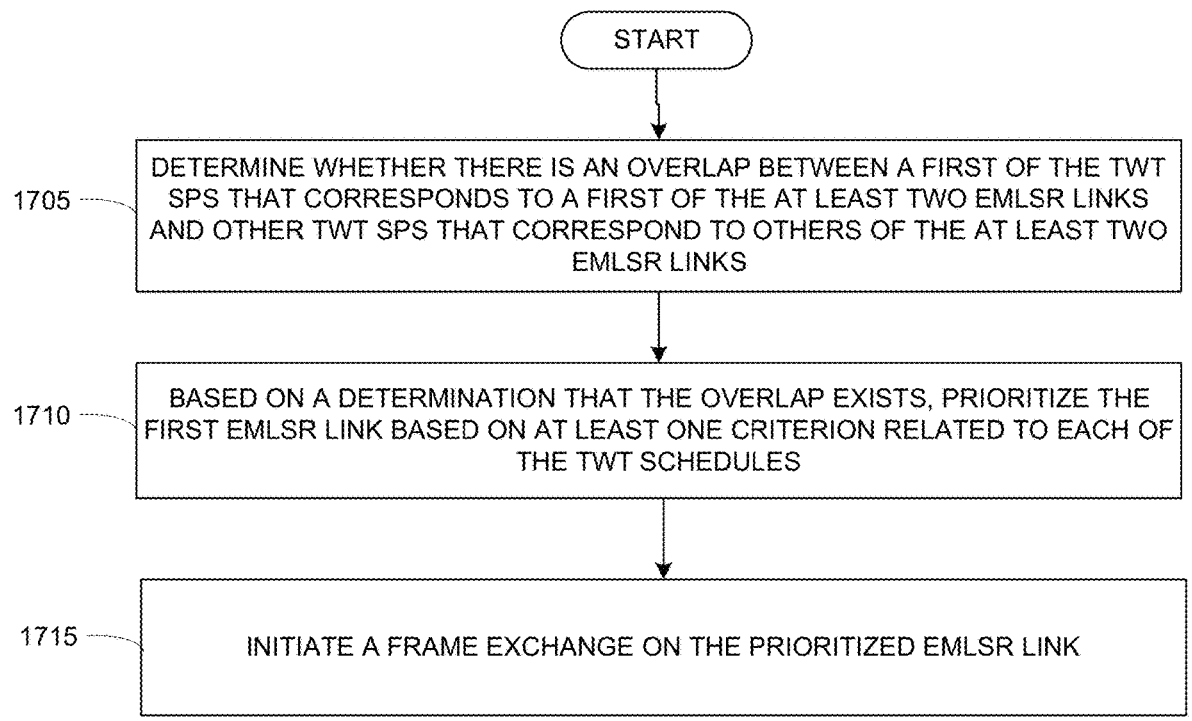
FIG. 17 illustrates an example process for the coexistence of TWT operation and EMLSR operation for MLDs in a WLAN when multiple TWT schedules are established on multiple links between an AP MLD and a non-AP MLD according to various embodiments of the present disclosure.

FIG. 17 illustrates an example process for the coexistence of TWT operation and EMLSR operation for MLDs in a WLAN when multiple TWT schedules are established on multiple links between an AP MLD and a non-AP MLD according to various embodiments of the present disclosure. The process of FIG. 17 is discussed as being performed by a non-AP MLD, but it is understood that a corresponding AP MLD performs a corresponding process. Similarly, it is understood that the roles of the non-AP MLD and AP MLD can be reversed, and the AP MLD can perform the example process of FIG. 17. For convenience, the process of FIG. 17 is discussed as being performed by a WI-FI non-AP MLD comprising a plurality of STAs that each comprise a transceiver configured to form a link with a corresponding AP affiliated with a WI-FI AP MLD, wherein at least a subset of the links are EMLSR links that are configured to operate in an EMLSR mode of operation, and wherein TWT schedules are established for communications on at least two of the EMLSR links, each of the TWT schedules having a TWT SP. However, it is understood that any suitable wireless communication device could perform these processes.

Referring to FIG. 17, the process begins with the non-AP MLD determining whether there is an overlap between a first of the TWT SPs that corresponds to a first of the at least two EMLSR links and other TWT SPs that correspond to others of the at least two EMLSR links (step 1705). TWT SPs may be considered to overlap if the end time of one TWT SP is after the start time of another TWT SP, or if the end time of one TWT SP is less than a guard time (e.g., an EMLSR Transition Delay time) before the start time of another TWT SP.

Next, based on a determination that the overlap exists, the non-AP MLD prioritizes the first EMLSR link based on at least one criterion related to each of the TWT schedules (step 1710). The at least one criterion can include, for example, a priority of TIDs that are negotiated for the corresponding TWT SP, the type of the TWT schedule (e.g., whether the TWT schedule is a restricted TWT schedule), and a start time of the corresponding TWT SP.

In one example, the non-AP MLD prioritizes the first EMLSR link based on the first TWT SP having the highest priority TIDs as compared to the rest of the TWT SPs that correspond to the others of the at least two links.

In another example, the non-AP MLD prioritizes the first EMLSR link based on the TWT schedule established on the first EMLSR link being a restricted TWT schedule.

In yet another example, the non-AP MLD prioritizes the first EMLSR link based on the start time of the first TWT SP being earlier than the start times of the other TWT SPs and the priority of the TIDs negotiated for the first TWT SP being higher than or equivalent to the priorities of the TIDs negotiated for the other TWT SPs.

In yet another example, the non-AP MLD prioritizes the first EMLSR link based on the start time of the first TWT SP being later than the start times of the other TWT SPs and the priority of the TIDs negotiated for the first TWT SP being higher than the priorities of the TIDs negotiated for the other TWT SPs.

In some embodiments, the non-AP MLD additionally determines, at step 1710, whether TIDs that are negotiated for the first TWT SP (or mapped to the first EMLSR link via TID-to-link mapping) are also mapped to a second TWT SP that corresponds to a second of the at least two EMLSR links. If so, the non-AP MLD may allow the non-AP STA associated with the second link to remain in a doze state during the second TWT SP, while the frame exchange is conducted on the first link. Furthermore, if the end time of the second TWT SP is later than the end time of the first TWT SP, the end time of the first TWT SP may be extended to match the end time of the second TWT SP.

Finally, at step 1715, the non-AP MLD initiates a frame exchange on the prioritized EMLSR link. In some embodiments, the non-AP MLD may additionally generate a frame that includes an indication of the prioritized EMLSR link (e.g., an RLS subfield identifying the first link) and transmit the frame to the AP MLD before the initiation of the frame exchange. In some embodiments, the AP MLD may initiate the frame exchange at step 1715 based on, for example, an indication of the first link provided by the non-AP MLD (e.g., the RLS subfield identifying the first link).

The above flowchart illustrates an example method or process that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A non-access point (AP) multi-link device (MLD), comprising:
    stations (STAs), each comprising a transceiver configured to form a link with a corresponding AP of an AP MLD, wherein:
        at least a subset of the links are enhanced multi-link single radio (EMLSR) links that are configured to operate in an EMLSR mode of operation, and
        target wake time (TWT) schedules are established for communications on at least two of the EMLSR links, each of the TWT schedules having a TWT service period (SP); and
    a processor operably coupled to the STAs, the processor configured to:
        determine whether there is an overlap between a first of the TWT SPs that corresponds to a first of the at least two EMLSR links and other TWT SPs that correspond to others of the at least two EMLSR links,
        based on a determination that the overlap exists, prioritize the first EMLSR link based on at least one criterion related to each of the TWT schedules and includes a priority of traffic identifiers (TIDs) negotiated for the first TWT SP being higher than or equivalent to the priority of the TIDs negotiated for the other TWT SPs, and
        initiate a frame exchange on the prioritized EMLSR link.

2. The non-AP MLD of claim 1, wherein:
    the at least one criterion includes the priority of the TIDs that are negotiated for the corresponding TWT SP, and
    the processor is further configured to prioritize the first EMLSR link based on the first TWT SP having the highest priority TIDs.

3. The non-AP MLD of claim 1, wherein:
    the at least one criterion includes whether the TWT schedule is a restricted TWT schedule, and
    the processor is further configured to prioritize the first EMLSR link based on the TWT schedule established on the first EMLSR link being a restricted TWT schedule.

4. The non-AP MLD of claim 1, wherein:
    the at least one criterion includes a start time of the corresponding TWT SP and a priority of TIDs that are negotiated for the corresponding TWT SP, and
    the processor is further configured to prioritize the first EMLSR link based on:
        the start time of the first TWT SP being earlier than the start times of the other TWT SPs.

5. The non-AP MLD of claim 1, wherein:
    the at least one related criterion includes a start time of the corresponding TWT SP and a priority of TIDs that are negotiated for the corresponding TWT SP, and
    the processor is further configured to prioritize the first EMLSR link based on:
        the start time of the first TWT SP being later than the start times of the other TWT SPs; and
        the priority of the TIDs negotiated for the first TWT SP being higher than the priorities of the TIDs negotiated for the other TWT SPs.

6. The non-AP MLD of claim 1, wherein the processor is further configured to:
    determine whether TIDs that are negotiated for the first TWT SP are also negotiated for a second TWT SP of the other TWT SPs;
    based on a determination that a second end time of the second TWT SP is later than a first end time of the first TWT SP, extend the first end time to match the second end time; and
    allow a second EMLSR link corresponding to the second TWT SP to remain in a doze state during the first TWT SP on the prioritized EMLSR link.

7. The non-AP MLD of claim 1, wherein:
    the processor is further configured to generate a frame that includes an indication of the prioritized EMLSR link; and at least one of the transceivers is further configured to transmit the generated frame to the AP MLD before the initiation of the frame exchange.

8. An access point (AP) multi-link device (MLD), comprising:
APs, each comprising a transceiver configured to form a link with a corresponding station (STA) of a non-AP MLD, wherein:
at least a subset of the links are enhanced multi-link single radio (EMLSR) links that are configured to operate in an EMLSR mode of operation, and
target wake time (TWT) schedules are established for communications on at least two of the EMLSR links, each of the TWT schedules having a TWT service period (SP); and
a processor operably coupled to the APs, the processor configured to:
determine whether there is an overlap between a first of the TWT SPs that corresponds to a first of the at least two EMLSR links and other TWT SPs that correspond to others of the at least two EMLSR links,
based on a determination that the overlap exists, prioritize the first EMLSR link based on at least one criterion related to each of the TWT schedules and includes a priority of traffic identifiers (TIDs) negotiated for the first TWT SP being higher than or equivalent to the priority of the TIDs negotiated for the other TWT SPs, and
initiate a frame exchange on the prioritized EMLSR link.

9. The AP MLD of claim 8, wherein:
the at least one criterion includes the priority of the TIDs that are negotiated for the corresponding TWT SP, and
the processor is further configured to prioritize the first EMLSR link based on the first TWT SP having the highest priority TIDs.

10. The AP MLD of claim 8, wherein:
the at least one criterion includes whether the TWT schedule is a restricted TWT schedule, and
the processor is further configured to prioritize the first EMLSR link based on the TWT schedule established on the first EMLSR link being a restricted TWT schedule.

11. The AP MLD of claim 8, wherein:
the at least one criterion includes a start time of the corresponding TWT SP and a priority of TIDs that are negotiated for the corresponding TWT SP, and
the processor is further configured to prioritize the first EMLSR link based on:
the start time of the first TWT SP being earlier than the start times of the other TWT SPs.

12. The AP MLD of claim 11, wherein:
the at least one related criterion includes a start time of the corresponding TWT SP and a priority of TIDs that are negotiated for the corresponding TWT SP, and
the processor is further configured to prioritize the first EMLSR link based on:
the start time of the first TWT SP being later than the start times of the other TWT SPs; and
the priority of the TIDs negotiated for the first TWT SP being higher than the priorities of the TIDs negotiated for the other TWT SPs.

13. The AP MLD of claim 11, wherein the processor is further configured to:
determine whether TIDs that are negotiated for the first TWT SP are also negotiated for a second TWT SP of the other TWT SPs;

based on a determination that a second end time of the second TWT SP is later than a first end time of the first TWT SP, extend the first end time to match the second end time; and
allow a second EMLSR link corresponding to the second TWT SP to remain in a doze state during the first TWT SP on the prioritized EMLSR link.

14. The AP MLD of claim 8, wherein:
the processor is further configured to generate a frame that includes an indication of the prioritized EMLSR link; and
at least one of the transceivers is further configured to transmit the generated frame to the non-AP MLD before the initiation of the frame exchange.

15. A method of wireless communication performed by a non-access point (AP) multi-link device (MLD) that comprises stations (STAs) that each comprise a transceiver configured to form a link with a corresponding AP of an AP MLD, at least a subset of the links being enhanced multi-link single radio (EMLSR) links that are configured to operate in an EMLSR mode of operation, and target wake time (TWT) schedules being established for communications on at least two of the EMLSR links, each of the TWT schedules having a TWT service period (SP), the method comprising:
determining whether there is an overlap between a first of the TWT SPs that corresponds to a first of the at least two EMLSR links and other TWT SPs that correspond to others of the at least two EMLSR links;
based on a determination that the overlap exists, prioritizing the first EMLSR link based on at least one criterion related to each of the TWT schedules and includes a priority of traffic identifiers (TIDs) negotiated for the first TWT SP being higher than or equivalent to the priority of the TIDs negotiated for the other TWT SPs; and
initiating a frame exchange on the prioritized EMLSR link.

16. The method of claim 15, wherein:
the at least one criterion includes the priority of the TIDs that are negotiated for the corresponding TWT SP, and
the method further comprises prioritizing the first EMLSR link based on the first TWT SP having the highest priority TIDs.

17. The method of claim 15, wherein:
the at least one criterion includes whether the TWT schedule is a restricted TWT schedule, and
the method further comprises prioritizing the first EMLSR link based on the TWT schedule established on the first EMLSR link being a restricted TWT schedule.

18. The method of claim 15, wherein:
the at least one criterion includes a start time of the corresponding TWT SP and a priority of TIDs that are negotiated for the corresponding TWT SP, and
the method further comprises prioritizing the first EMLSR link based on:
the start time of the first TWT SP being earlier than the start times of the other TWT SPs.

19. The method of claim 18, further comprising:
determining whether TIDs that are negotiated for the first TWT SP are also negotiated for a second TWT SP of the other TWT SPs;
based on a determination that a second end time of the second TWT SP is later than a first end time of the first TWT SP, extending the first end time to match the second end time; and allowing a second EMLSR link corresponding to the second TWT SP to remain in a doze state during the first TWT SP on the prioritized EMLSR link.

20. The method of claim 15, further comprising:
generating a frame that includes an indication of the prioritized EMLSR link; and
transmitting the generated frame to the AP MLD before the initiation of the frame exchange.

\* \* \* \* \*